United States Patent [19]
Petersen et al.

[11] Patent Number: 5,978,375
[45] Date of Patent: Nov. 2, 1999

[54] TELECOMMUNICATION SYSTEM AND A METHOD FOR TRANSFERRING MICROCELLS THEREIN

[75] Inventors: Lars-Göran Petersen, Tumba; Mats Olstedt, Bromma, both of Sweden

[73] Assignee: Telefonaktiebolaget LM Ericsson, Stockholm, Sweden

[21] Appl. No.: 08/956,452

[22] Filed: Oct. 23, 1997

Related U.S. Application Data

[63] Continuation of application No. PCT/SE96/00530, Apr. 23, 1996.

[30] Foreign Application Priority Data

Apr. 24, 1995 [SE] Sweden ................................ 9501489
Jan. 25, 1996 [SE] Sweden ................................ 9600277

[51] Int. Cl.⁶ .................................................. H04L 12/56
[52] U.S. Cl. ..................... 370/395; 370/473; 370/476
[58] Field of Search ................................... 370/395, 397, 370/410, 470, 471, 472, 473, 474, 465, 468, 537, 522, 476

[56] References Cited

U.S. PATENT DOCUMENTS

| | | |
|---|---|---|
| 4,999,835 | 3/1991 | Lagoutte . |
| 5,287,348 | 2/1994 | Schmidt et al. . |
| 5,583,859 | 12/1996 | Feldmeier ............................ 370/473 |
| 5,606,552 | 2/1997 | Baldwin et al. ..................... 370/474 |
| 5,742,610 | 4/1998 | Natarajan ............................ 370/472 |
| 5,774,469 | 6/1998 | Wirkestrand ........................ 370/473 |
| 5,802,050 | 9/1998 | Petersen et al. .................... 370/473 |
| 5,802,051 | 9/1998 | Petersen et al. .................... 370/395 |
| 5,809,023 | 9/1998 | Petersen et al. .................... 370/465 |
| 5,822,321 | 10/1998 | Petersen et al. .................... 370/474 |

FOREIGN PATENT DOCUMENTS

| | | |
|---|---|---|
| 544 217 | 6/1993 | European Pat. Off. . |
| 2 270 820 | 3/1994 | United Kingdom . |
| 95/34977 | 12/1995 | WIPO . |

*Primary Examiner*—Chau Nguyen
*Attorney, Agent, or Firm*—Burns, Doane, Swecker, & Mathis, L.L.P.

[57] ABSTRACT

A telecommunication system has a sending entity, a receiving entity, and an ATM link between the sending and receiving entities for transferring ATM cells on specific separate ATM connections. The ATM cells include user ATM cells having a header and payload containing data in the form of a determined number of data units which carry data in microcells. The header includes an ATM connection pointer. The microcells have payload for carrying a variable size user data package and a microcell header containing code identifying a microcell connection. A microcell unable to fit in its entirety in a remaining space of an ATM cell belonging to a certain ATM connection is divided into a first part located in a least on following ATM cell belonging to the same ATM connection. Microcell size information is associated with each microcell. Methods for finding microcell boundaries are provided.

44 Claims, 21 Drawing Sheets microcell disassemble function
flowchart according to alignment
method described in fig.6.

microcell disassemble function
flowchart according to alignment
method described in fig. 7.

- ●→ SDU-Type=0 (MSP in first payload octet)
- ○ SDU-Type=1 (microcell occupies first octet in payload)

TELECOMMUNICATION SYSTEM AND A METHOD FOR TRANSFERRING MICROCELLS THEREIN

This application is a continuation of International Application No. PCT/SE96/00530, filed Apr. 23, 1996, which designates the United States.

BACKGROUND

The present invention generally relates to a telecommunication system in which ATM cells are being used for transmission of both voice-type data and other types of user data. The voice-type data is carried in microcells which in turn are carried in the payload of the ATM cells. The other types of user data are carried directly in the payload of the ATM cells.

More specifically, the invention relates to a telecommunication system comprising a sending entity, a receiving entity and an ATM link between the sending and receiving entities for transferring ATM cells on specific separate ATM connections. The ATM cells include user ATM cells having a header and payload containing data in the form of a determined number of data units which carry data in microcells, the header including an ATM connection pointer. The microcells have payload for carrying a variable size user data package and a microcell header containing code (CID) identifying a microcell connection. A microcell being not able to fit in its entirety in a remaining space of an ATM cell belonging to a certain ATM connection is divided into a first part located in at least one following ATM cell belonging to the same ATM connection. Microcell size information is associated with each microcell.

The method according to the invention relates to transferring microcells in a-telecommunication system of the kind just described.

Asynchronous Transfer Mode (ATM) is a technology that provides for efficient utilization of bandwidth in a telecommunications network for a broad variety of telecommunication services. Due to the large capital in existing equipment based on Synchronous Transfer Mode (STM) technology though, a mixed network type in which both ATM and STM technology resides is likely to evolve and persist for quite some time.

ATM stipulates that data be carried in fixed-size packets of 53 octets. The packets are referred to as ATM cells. The ATM cell size however penalizes some narrowband services. User information relating to such a narrowband service, e.g. voice samples of the Plain Old Telephony Service (POTS), is converted in a user terminal, e.g. a telephone, or elsewhere into a low-rate stream of digital data. This data is referred to as voice-type data. Voice-type data may originate from other information sources than voice, such as compressed video.

A time required to assemble data and place it in the payload of a cell causes a delay referred to as a cell assembly delay. Assembling enough voice-type data from a user terminal to completely fill an ATM cell takes considerable time. At a rate of 64 kbit/s, typical to POTS, awaiting 48 octets which can be accommodated in the payload of an ATM cell takes 6 ms. The cell assembly delay is hence 6 ms.

Each time voice-type data in the previously said low-rate stream format enters an ATM domain of the aforementioned mixed network, a 6 ms cell assembly delay is appended to the total delay of the voice-type data.

Voice-type data is delay sensitive, typically as it relates to interactive services. Network deficiencies necessitate echo cancellers when the total delay, including e.g. propagation delay, exceeds a certain value. This value depends on the network quality, and is sometimes less than 25 ms. Echo cancellers add to the cost for providing the service. Above a 100 ms delay, a service degradation is starting to become evident to a user, even with echo cancellers.

With a 6 ms cell assembly delay, a total voice data delay budget for attaining a high service quality is easily overdrawn. The service quality may not even be acceptable to the user. New voice services, such as mobile telephony, employ less bandwidth than do traditional POTS:s. The cell assembly delay for such lower bandwidth services is larger than for the POTS, thereby even further aggravating the situation.

ATM cells can optionally be only partially filled with voice data, resulting in a lower cell assembly delay. The bandwidth efficiency of partially filled ATM cells is however not as high as the efficiency of completely filled cells. An ATM cell carrying e.g. 4 voice data octets has a bandwidth efficiency of less than 10%.

A reasonable delay of voice-type data can be accomplished without sacrificing a lot of bandwidth in the ATM domains, by carrying voice-type data in variable-size packets in the payload of ATM cells. Such packets are referred to as microcells, as they are typically considerably smaller than an ATM cell, however similar in structure and usage.

Several microcells can be accommodated in the same ATM cell. Utilization is further improved by allowing a microcell which can not be fit in its entirety in the remaining space of an ATM cell, to be divided into a first part filling the remaining space of one such ATM cell, and a second part to be placed in another ATM cell.

A problem however, in a node for receiving microcells, is finding the boundaries of the microcells, such that microcell synchronization can be achieved.

In GB 2,270,820-A a STM/ATM network interface is described, in which information is carried in packets, which in turn can be carried in ATM cells. Parity and a packet-size indicator in the packet header is used for synchronization.

SUMMARY

An object of the invention is to solve the aforementioned problem of finding the boundaries of microcells in a receiving node of a telecommunication system.

This object and other objects which will appear further below is accomplished through a method and a system as defined in the accompanying claims.

According to a first aspect the telecommunication system defined above has microcell boundary indicating code including a microcell start pointer located in each ATM cell in the first one of the data units and pointing at a first new microcell within the payload of the ATM cell. The microcell start pointer includes code able to indicate the size of the remaining part of a divided microcell.

According to a second aspect the telecommunication system has microcell boundary indicating code including a microcell start pointer located in every n-th ATM cell in the first one of the data units and pointing at a first new microcell within the payload of the ATM cell. The microcell start pointer includes code able to indicate the size of the remaining part of a divided microcell. Code located in the header of each ATM cell is able to be set to indicate whether the first data unit in the ATM cell is a microcell start pointer or not.

In both of the above mentioned aspects the microcell start pointer may be able to take a value indicating that the whole rest of the ATM cell payload following on the microcell pointer contains part of a microcell.

According to a third aspect the telecommunication system has microcell boundary indicating code including microcell division indicating code located in the header of each ATM cell and able to be set to indicate whether the first microcell in the ATM cell is a new one or a divided one.

According to a fourth aspect the telecommunication system has code providing that start of an ATM cell payload is only allowed with a new microcell. The microcell boundary indicating code including code to provide that if the space of the last data unit in the ATM cell payload is not enough for entering a further microcell therein this microcell will be sent in a next ATM cell belonging to the same connection. The space will be filled with a microcell being not assigned to any microcell connection.

In all of the above aspects the microcell size information may be in the form of a size indicator in the header of each microcell, or be located in a table.

Advantages of the invention will appear from the following specification.

BRIEF DESCRIPTION OF DRAWINGS

The invention will now be described more closely with reference to the attached drawings, in which FIG. 1 schematically illustrates a telecommunication system comprising a sending entity, a receiving entity and an ATM link therebetween, FIG. 2 schematically indicates the structure of an ATM-cell, FIG. 3 schematically illustrates an examplary structure of a microcell, FIGS. 4a–c schematically illustrate basic principles of a first method for aligning a microcell stream in an ATM cell payload, FIG. 5 in some more detail indicates how microcells can be multiplexed and divided between ATM-cells in the first aligning method, FIG. 6 schematically illustrates basic principles of a second method for aligning a microcell stream in an ATM cell payload, FIG. 7 schematically illustrates basic principles of a third method for aligning a microcell stream in an ATM cell payload.

DETAILED DESCRIPTION

Figure 1:
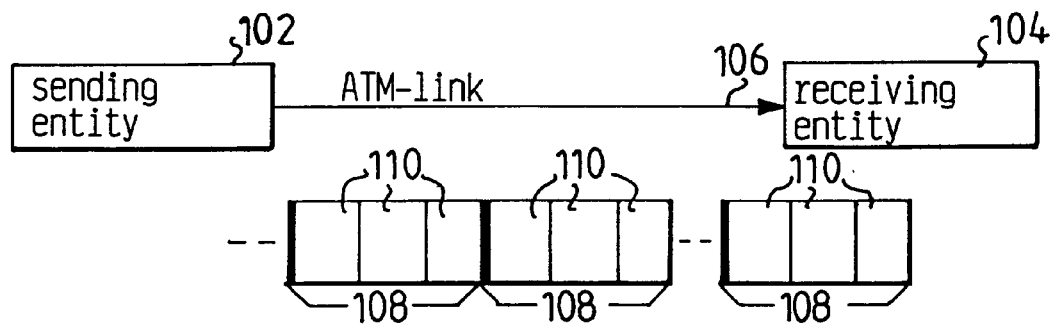

FIG. 1 schematically indicates a sending entity 102 for sending ATM cells, a receiving entity 104 for receiving ATM cells, and an interconnecting link 106 which conveys ATM cells from the sending entity to the receiving entity. The interconnecting link can be of a standard type well known in the art. More particularly, it may be a single physical interconnection, or an ATM network consisting of several physical interconnections and nodes. The link 106 carries a stream of ATM cells 108 having a payload that can include microcells 110 of various sizes.

The sending entity 102 and receiving entity 104 can be a switch or end destination equipment. As an example, there can be the question of a switch of the kind described in the Swedish patent application No. 9402051-8, filed on Jun. 13, 1994, "Circuit emulating exchange using microcells". The same switch could also be used as end equipment. This patent application has a counterpart in U.S. patent application Ser. No. 08/459,127, incorporated herein by reference.

Figure 2:
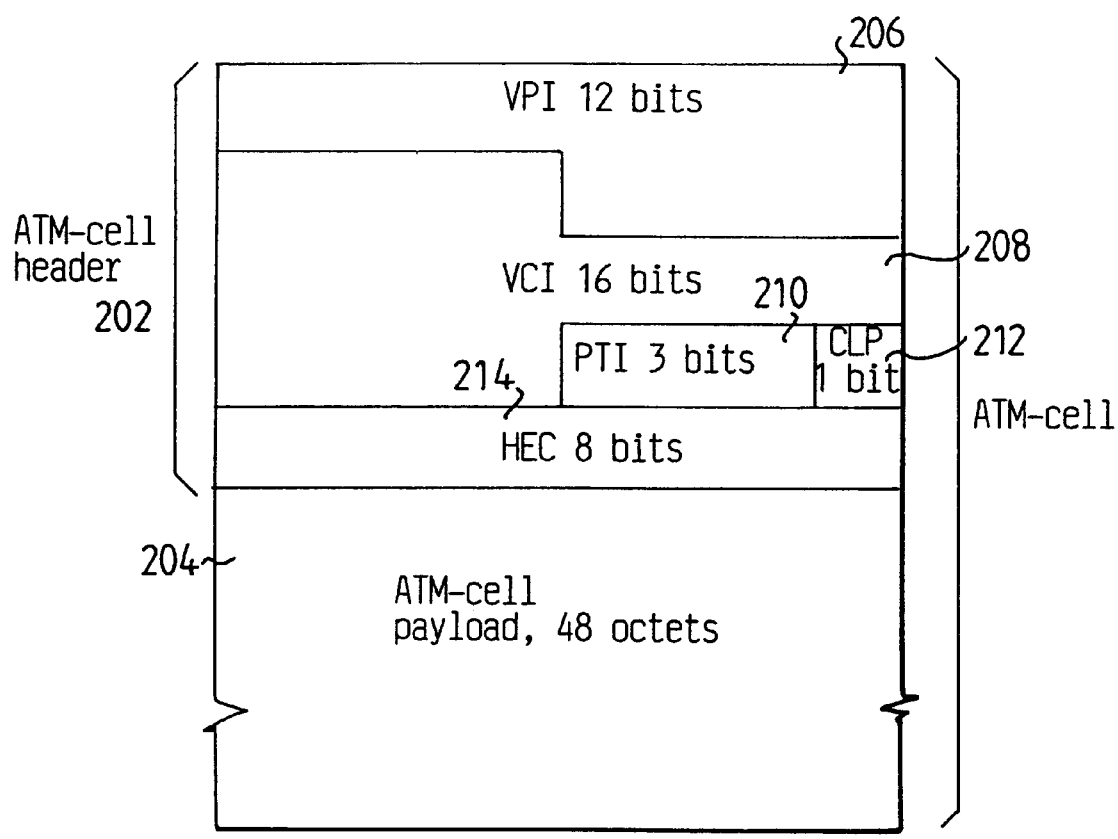
FIGS. 2a–b are flowcharts illustrating in more detail some steps in FIGS. 19a–c, FIG. 21 in views similar to those of FIG. 4 illustrates basic principles of a fourth alignment method.

FIG. 2 schematically indicates the structure of an ATM-cell which can e.g. contain a header 202 of 5 octets and a payload 204 of 48 octets. A standard ATM header contains a number of indicators. For the purpose of indicating type of connection this standard ATM header contains a 12 bit code called Virtual Path Identifier, henceforth referred to as VPI and indicated at 206, and a 16 bit code called Virtual Channel Identifier, henceforth referred to as VCI and indicated at 208.

For the purpose of discriminating between user ATM cells and non-user ATM cells there is furthermore 3 bit code called Payload Type Indicator, referred to as PTI and indicated at 210. Only ATM-cells identified as user ATM-cells can carry microcells in its payload. The PTI code identifying user ATM-cells discriminates between different types of so called Service Data Unit, below called SDU type, referring to the ATM cell payload. Thus, codes 0 and 2 indicate SDU-type=0 and codes 1 and 3 indicate SDU-type=1.

Furthermore, the ATM header 202 contains 1 bit code called Cell Loss Priority, CLP, indicated at 212, and 8 bit code called Header Error Check, HEC, used for cell synchronization and indicated at 214.

Figure 3:
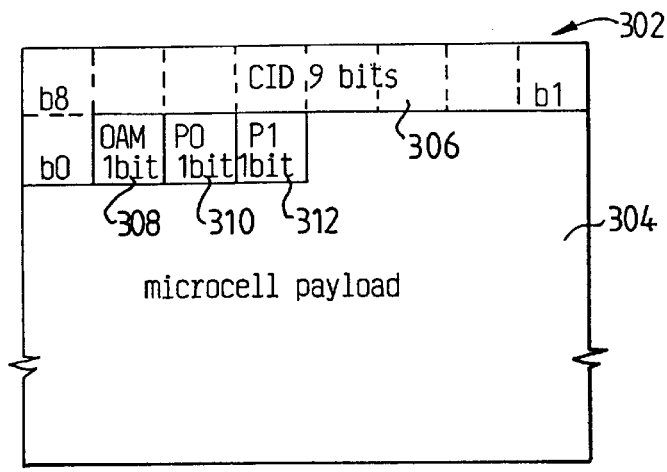

FIG. 3 schematically illustrates an examplary structure of a microcell. The microcell basically comprises a header 302 and a payload 304. The header contains 9 bit code 306 called Circuit Identifier, CID, 1 bit code 308 called Operation and Management bit, OAM, 1 bit code 310 called Parity 0 bit, P0, and 1 bit code 312 called Parity 1 bit, P1.

The 9 bits of the CID 306 are marked as b0 to b8 in FIG. 3. The CID is used to identify a microcell circuit. Up to 511 circuits can be discriminated in the case indicated.

The OAM bit 308 discriminates between a user microcell and an OAM microcell assigned to the same circuit. In case of a user microcell the microcell payload 304 contains user data. In case of an OAM microcell the microcell payload 304 contains data used for performance and fault management.

The P0 bit 310 is used to obtain odd parity for the P0 bit and the CID bits 0, 2, 4, 6, 8. The P1 bit 312 is used to obtain odd parity for the P1 bit, the OAM bit and the CID bits 1, 3, 5, 7. The parity bits are used to verify the correctness of the CID and OAM bits.

The payload 304 contains user data. The payload size is implicitly defined by the CID value. The actual size can be agreed at connection set up of the circuit, or have a pre-defined value for a certain CID. The size of the microcell header can vary depending upon the kind of application.

Some applications do not need a header of the magnitude shown in FIG. 3. Thus, the complete header can for example be as small as 6 bits allowing a CID of 4 bits, one OAM-bit and one parity bit.

Furthermore additional indicating code fields can be added, e.g. for sequence numbering and size. An OAM microcell assigned to the same circuit and ATM connection can have a different size than the user microcell. In that case the OAM microcell will be fixed in size.

The CID value 0 is used for unassigned microcells that are used for decoupling and implicitly indicates that it fills the remaining part of an ATM-cell payload. All other CID values are defined as assigned cells and reserved for the users. An unassigned cell disregards the OAM-bit. An assigned cell can also be used for decoupling but in that case with a fixed size, e.g. 2 octets. Any detected parity error shall be treated as if the microcell was unassigned.

The sending entity 102 of FIG. 1 should comprise means for handling microcells and putting them into the payload of an ATM-cell. The microcells are assembled according to the structure required for the microcell. All bits are generated accordingly. The sending entity 102 should be able to conform microcells coming from a switch able to handle microcells or take user data and put into a microcell agreed upon at establishment of a circuit.

The sending entity 102 should furthermore be able to insert, at regular interval, an OAM microcell in a flow directed to a circuit. The OAM microcell contains informative data, such as numbers of microcells and aggregated check data, etc., since the last OAM microcell. Different methods and schemes to generate data from the user data for fault and performance management carried by the OAM microcell are well known.

Establishing a circuit, i.e. agree on a CID and its size, is obtained by well known standardized signalling procedure in the ATM network. The signalling procedure assures that assembly and disassembly state machines in the sending and receiving entities are provided with the same static data.

The receiving entity 104 should comprise means to disassemble a microcell. The OAM microcells are handled according to known principles for fault and performance management. The user assigned microcells can be mapped to a switch capable of switching microcells, or disassembled into voice samples or any other format agreed upon at the establishment of the circuit. Unassigned microcells are wasted.

Below some methods for aligning a microcell stream in an ATM cell payload, i.e. finding microcell boundaries in a receiving entity, will be described.

Figure 4A:
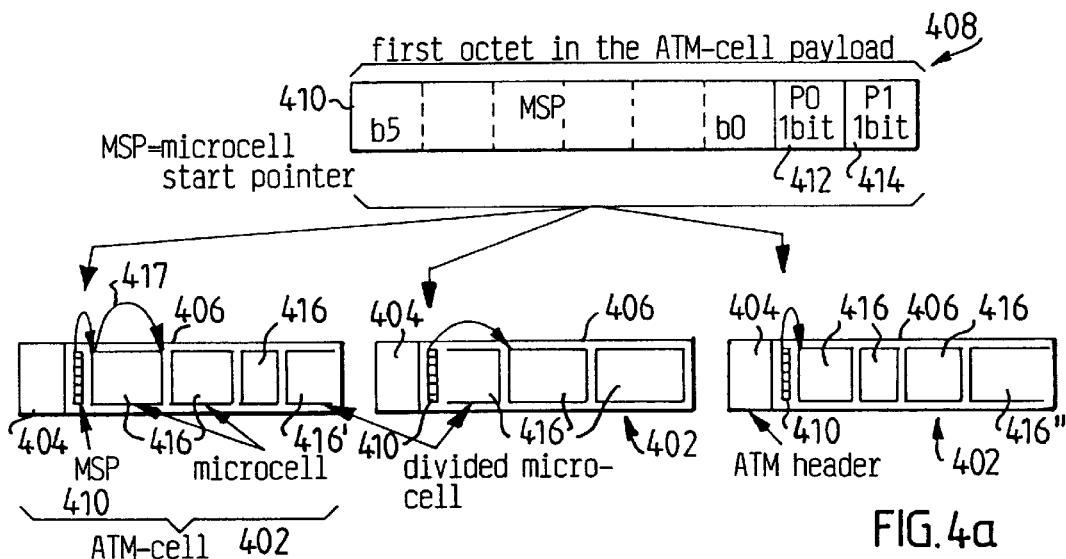

Basic principles of a first method will now be described with reference to FIG. 4. FIG. 4a illustrates three ATM cells 402, each having a header 404 and a payload 406, a first octet of the payload 406 being also shown in an enlarged scale above the cells 402 at 408. The first octet 408 contains a microcell start pointer 410, below also referred to as MSP, together with two parity bits P0 412 and P1 414. The MSP 410 is used to indicate the start of the microcell in the ATM-cell pay-load 406, and the parity bits 412 and 414 are used to verify the correctness of the MSP 410.

The main function of the MSP 410 is to align the microcell stream. With the MSP 410 a lost microcell alignment can be restored within the ATM-cell time frame. The P0 bit 412 is used to obtain odd parity for the P0 bit and the MSP bits 1, 3, 5. The P1 bit 414 is used to obtain odd parity for the P1 bit and the bits 0, 2, 4.

The remaining 47 octets of the ATM-cell payload 406 after the first octet can be used for microcells 416. A microcell that does not end up even with the last octet in the ATM-cell payload can be divided and continue in the next ATM-cell belonging to the same ATM connection (same VPI and VCI), as indicated at 416' and 416". If there is no assigned microcell present to fill the remaining part of the ATM-cell payload an unassigned microcell must be put there. The unassigned microcell is always as large as the remaining number of octets in the ATM-cell. A microcell size indicator located in the header of the first microcell of the first ATM cell 402 is indicated as an example by means of an arrow 417 pointing to the end of the microcell. Each microcell header should contain such a size indicator providing the size of the respective assigned microcell. An alternative possibility of providing the size of assigned microcells by means of table information is described later on with reference to FIG. 17.

Figure 4B:
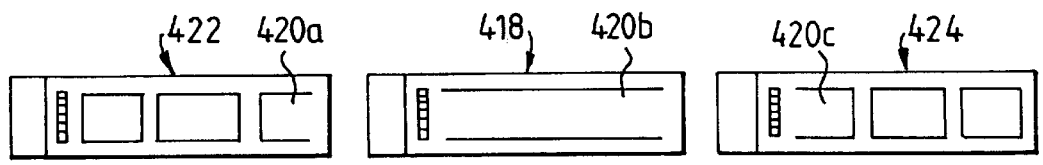
Figure 4C:
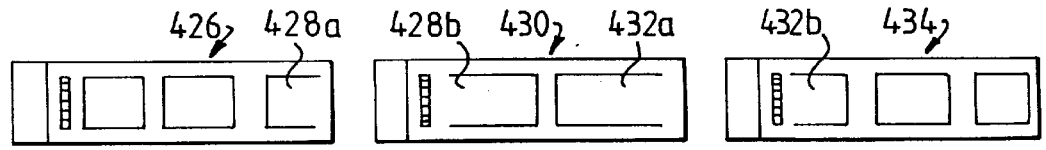

A microcell can start anywhere in the ATM-cell payload. The MSP 410 counts octets starting with value 1 indicating first octet in the ATM-cell payload and ending with the value 47 indicating the last octet in the ATM-cell payload. Values equal to 0 or larger than 47 are not accepted. Referring to FIG. 4b, the value 0 indicates for the ATM in question, indicated at 418, that it does only contain a part 420b of a divided microcell, that starts at 420a in the payload of a preceding ATM cell 422 and continues at 420c in the payload of a following ATM cell 424. Thus, the payload of the ATM cell 418 does not contain any complete microcell. Another example of an ATM cell containing no complete microcell is shown in FIG. 4c in which the payload of an ATM cell 426 is ended by a first part 428a of a divided microcell. This divided microcell continuous at 428b in the payload of a following ATM cell 430. In the ATM cell 430 the microcell part 428b is followed immediately by a first part 432a of another divided microcell. This divided microcell is ended by a second part 432b in the payload of a following ATM cell 434. Thus, the payload of the ATM cell 430 does neither contain any complete microcell.

Figure 5:
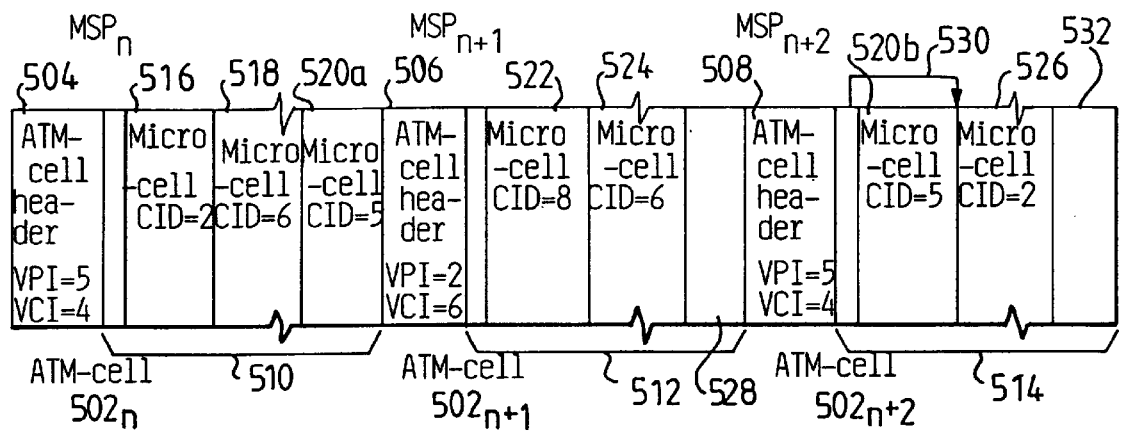

FIG. 5 indicates more in detail how microcells can be multiplexed and also be divided between ATM-cells and how ATM-cells not belonging to the same connection can come in between. Multiplexing of ATM-cells from different connections is fundamental for ATM and well known per se. In FIG. 5 three ATM cells $502_n$, $502_{n+1}$ och $502_{n+2}$ are shown, which have a respective header 504, 506 and 508, as well as a respective payload 510, 512 and 514.

Of the payload 510 of the ATM cell $502_n$ there are indicated only two complete microcells 516 and 518 and a first part 520a of a further microcell. Of the payload 512 of the ATM cell $502_{n+1}$ there are indicated only two complete microcells 522 and 524. Of the payload 514 of the ATM cell $502_{n+2}$ there is indicated only a remaining part 520b of the microcell, the first part 520a of which was located in the ATM cell $502_n$, as well as a complete microcell 526. It is thus indicated that a microcell, viz. the microcell 520a, b, can be divided between two ATM-cells, viz. the cells 510 and 514, by overlapping the payload of two ATM-cells, viz. the cells $502_n$ and $502_{n+2}$. The two ATM-cells $502_n$ and $502_{n+2}$ are supposed to belong to the same ATM connection, while the ATM cell $502_{n+1}$ between these belongs to another ATM connection.

In the header 504 of the ATM cell $502_n$ the VPI has the value 5 and the VCI has the value 4. That connection indicates that the cell carries microcells in the ATM-cell payload 510. The microcell start pointer, indicated by $MSP_n$, of this cell points in this case at microcell 516 having a CID value of 2, the CID indicating the length of the microcell. After the first microcell 516 follows the microcell 518 having a CID value of 6, the CID indicating the length of the cell. Thereafter the microcell part 520a having a CID value of 5 appears in the ATM-cell payload 510.

As has appeared from the above description a microcell, such as the microcell 520, that is longer than a remaining space in the ATM-cell payload, will be divided and the remaining part will be put in the beginning of an ATM-cell later in the stream of ATM cells. It can be the next ATM-cell but it can also be after an undefined number of ATM-cells. This is caused in that, in accordance with the nature of ATM, ATM-cells are multiplexed asynchronously into a stream with no specific order. Only ATM-cells belonging to the same connection are not allowed to pass each other and must therefore follow in sequence. In the present case the ATM cell $502_{n+1}$ is coming in between. In the header 506 of this cell the VPI has the value 2 and the VCI has the value 6 indicating that the ATM cell $502_{n+1}$ belongs to another connection. The ATM-cell $502_{n+1}$ also contains microcells in this fictitious example implicitly defined by the VPI and the VCI. However it could as well contain any type of data in the ATM-cell payload.

The $MSP_{n+1}$ has the value 1 for indicating that the start of a microcell follows, i.e. microcell 522. The microcells 522 and 524 can, as an example, have the CID values 8 and 6, respectively. A remaining part of the microcell space of the ATM cell payload 512 is indicated at 528 and can be used for other assigned microcells or filled with an unassigned microcell.

In the header 508 of the ATM cell $502_{n+2}$ the VPI should have the value 5 and the VCI the value 4, indicating that this ATM cell belongs to the same connection as the ATM-cell $502_n$ as has been mentioned earlier. The first microcell after the $MSP_{n+2}$ is the remaining part 520b of the pending microcell beginning as 520a in ATM-cell $502_n$. There should be two indications for this. First the $MSP_{n+2}$ should point at the next microcell 526 as indicated by arrow 530. Secondly a state machine for the ATM connection (VPI=5 and VCI=4) should indicate a pending microcell 520a, b with CID=5. The remaining number of octets in the payload 514 can be retrieved in two ways at the receiving entity. One way is to store the current number of octets in a variable belonging to the ATM connection. The other way can be to use the pointer 530 contained in the $MSP_{n+2}$ field. The MSP value gives the size of the remaining part of a divided microcell. A remaining part 532 of the microcell space 514 of the ATM-cell $502_{n+2}$ payload can be used for other assigned microcells or filled with an unassigned microcell.

Basic principles of a second method for aligning a microcell stream in an ATM cell payload, i.e. finding microcell boundaries in a receiving entity will now be described with reference to FIG. 6.

Figure 6:
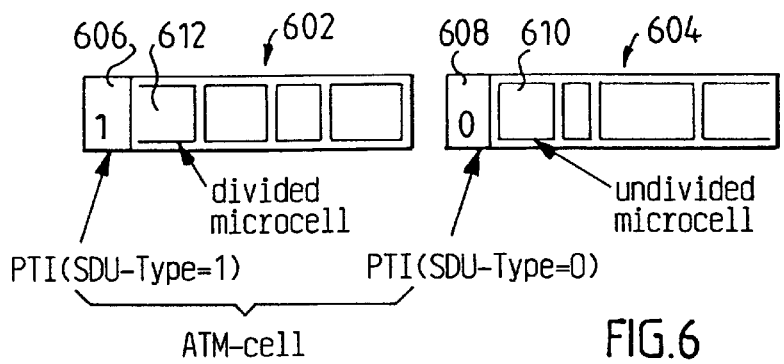

FIG. 6 schematically illustrates two ATM cells 602 and 604. The second method is based upon using the PTI-field described above with reference to FIG. 2. The PTI-fields for the ATM cells 602 and 604 are indicated at 606 and 608, respectively. This allows using the first octet in the ATM-cell payload for microcells instead of a microcell start pointer as in the first method. Thus, all 48 octets can be used to carry microcells. The code for SDU-type=0 is used to indicate that a new microcell starts in the first octet of the ATM-cell payload, as indicated at 610 for the ATM cell 604. The code for SDU-type=1 is used to indicate that a divided microcell continues in the first octet of the ATM-cell payload, as indicated at 612 for the ATM cell 602. The remaining number of octets of the divided microcell must be fetched from the state machine handling the ATM connection. To be able to re-align within a reasonable time the sending entity 102 should have means to allow only a limited number of consecutive ATM-cells for a given connection with SDU-type=1 before an ATM-cell with SDU-type=0 is sent. The receiving entity 104 is thereby allowed to re-align when the microcell synchronization is lost. The way of coding SDU is known in the art and has been described earlier in connection with FIG. 2. Repeated in short here, each SDU type represents two code points in the PTI-field. SDU type=0 is coded as 0 and 2. SDU type=1 is coded as 1 and 3.

Basic principles of a third method for aligning a microcell stream in an ATM cell payload, i.e. finding microcell boundaries in a receiving entity will now be described with reference to FIG. 7.

Figure 7:
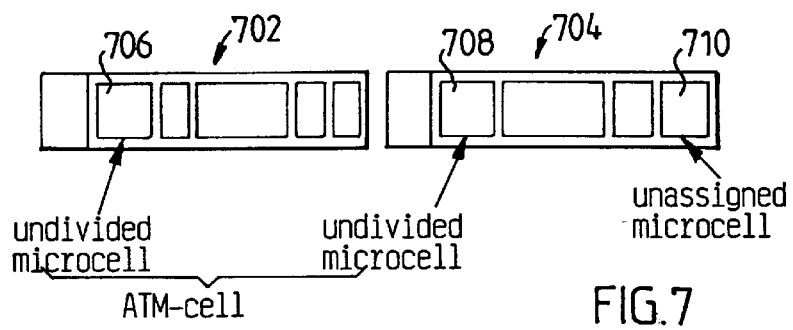

FIG. 7 schematically illustrates two ATM cells 702 and 704. The third method is based upon always starting with a new microcell in the first octet of the ATM cell payload and not allowing overlapping, as indicated in FIG. 7 for the first microcells 706 and 708 of the respective cells 702 and 704. All 48 octets can be used to carry microcells. The VPI and VCI implicitly tells that the ATM-cell payload always starts with a new microcell. If the last microcell does not fit into the remaining space, it has to be sent in the next ATM-cell belonging to the same connection. The remaining space of the ATM cell payload must be occupied by an unassigned microcell, as indicated for microcell 710 of the ATM cell 704.

Figure 8:
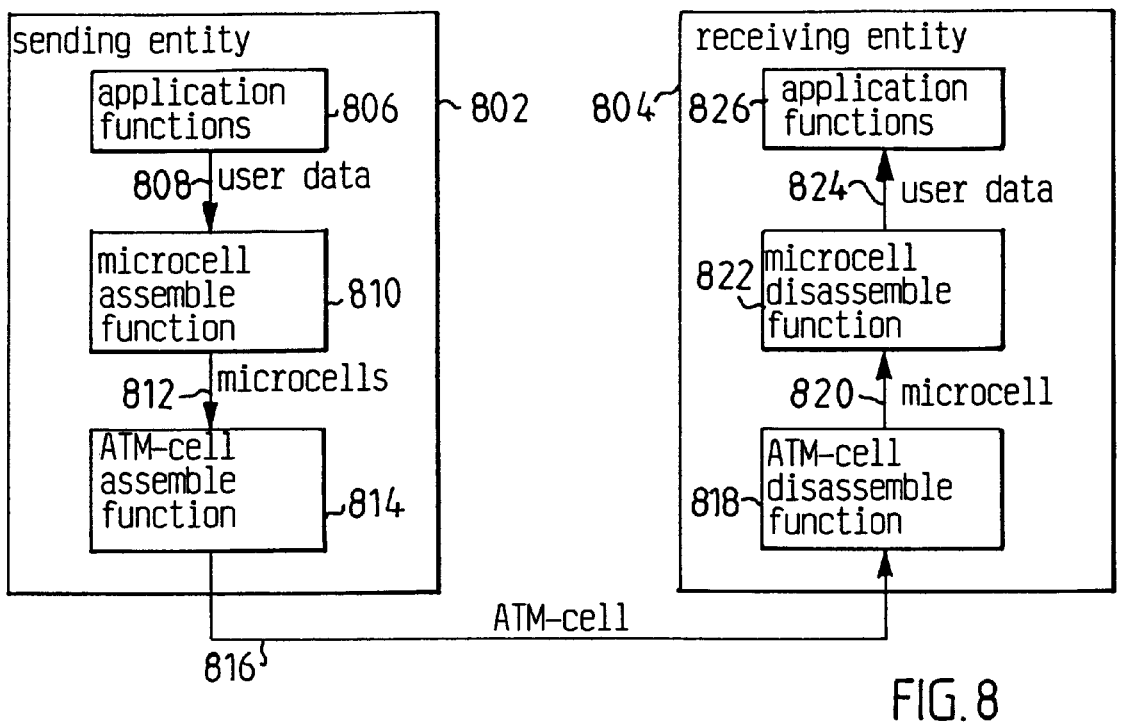
FIG. 8 is a high level functional flowchart illustrating steps of handling data for transfer from a sending entity to a receiving entity, FIG. 9 schematically illustrates way of operation of a microcell assembling function indicated in FIG. 8, FIG. 10 schematically illustrates an implementation of the microcell assembling function acording to FIG. 9.

FIG. 8 is a high level functional flowchart illustrating steps of handling data for transfer from a sending entity 802 to a receiving entity 804.

The sending entity 802 comprises application functionality 806 that presents user data 808 to a microcell assembling function 810. The application functionality 806 can be in the form of e.g. a switch, a time division multiplex line or assembled voice packets from a cellular network. It is presumed that user data arrive in the form of packets able to be put directly into a microcell payload. The size of the microcell is selected at connection establishment so as to fit a packet.

The microcell assembling function 810 puts the user data into the payload of a generated microcell. The microcell is then handed over, arrow 812, to an ATM cell assembling function 814. The ATM cell assembling function 814 multiplexes the microcell together with other microcells into an ATM cell stream on an ATM link 816 to the receiving entity 804.

The ATM cell stream terminates in an ATM cell disassembling function 818. The microcells in the payloads of the ATM cells are extracted and delivered, arrow 820, to a microcell disassembling function 822. The microcell disassembling function 822 extracts the user data from the payloads and presents it, arrow 824, to application functionality 826 in the receiving entity 804. Also here the application functionality can be e.g. a switch, a time division multiplex line or assembled voice packets from cellular networks.

Figure 9:
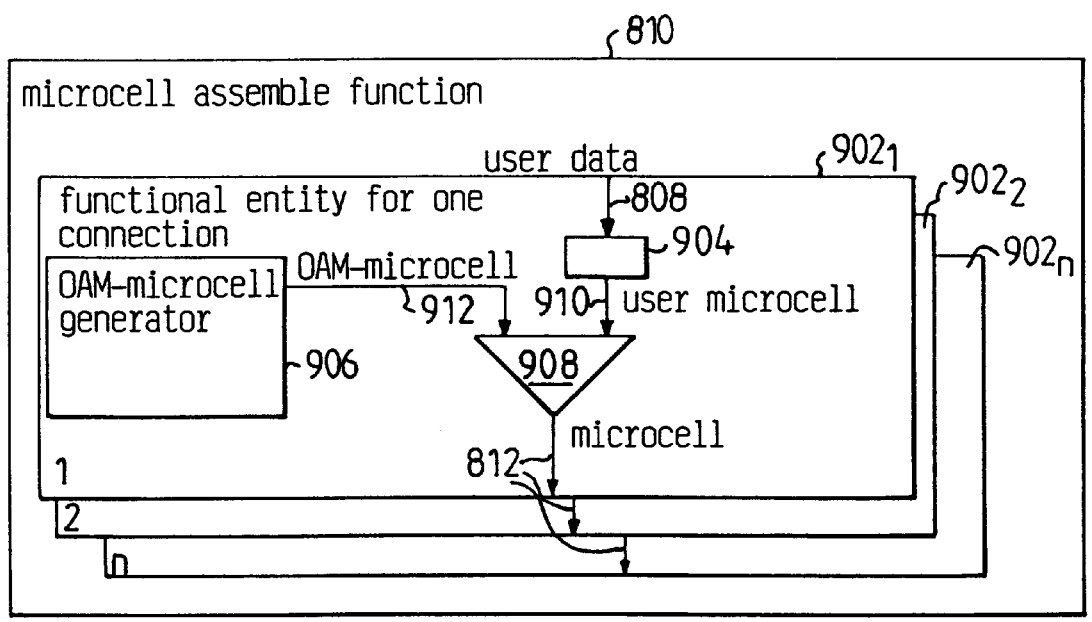

FIG. 9 schematically illustrates the way of operation of the microcell assembling function 810 in FIG. 8. The function 810 creates a number of functional entities $902_1$–$902_n$, one for each connection. The functional entities receive, arrow 808, user data for the respective connection and deliver complete microcells, arrows 812. The term functional entity used here and further on, is meant to mean a process together with hardware executing the process.

More particularly, each functional entity 902 has a user microcell assembling function 904 for putting the user data into the payload of a user microcell, and an OAM microcell generator 906 for generating OAM microcells after a pre-defined number of user cells. A microcell multiplexing function 908 receives, arrows 910 and 912, and selects between user microcells and OAM-microcells. The output 812 is presented to the ATM cell assembling function 814.

Figure 10:
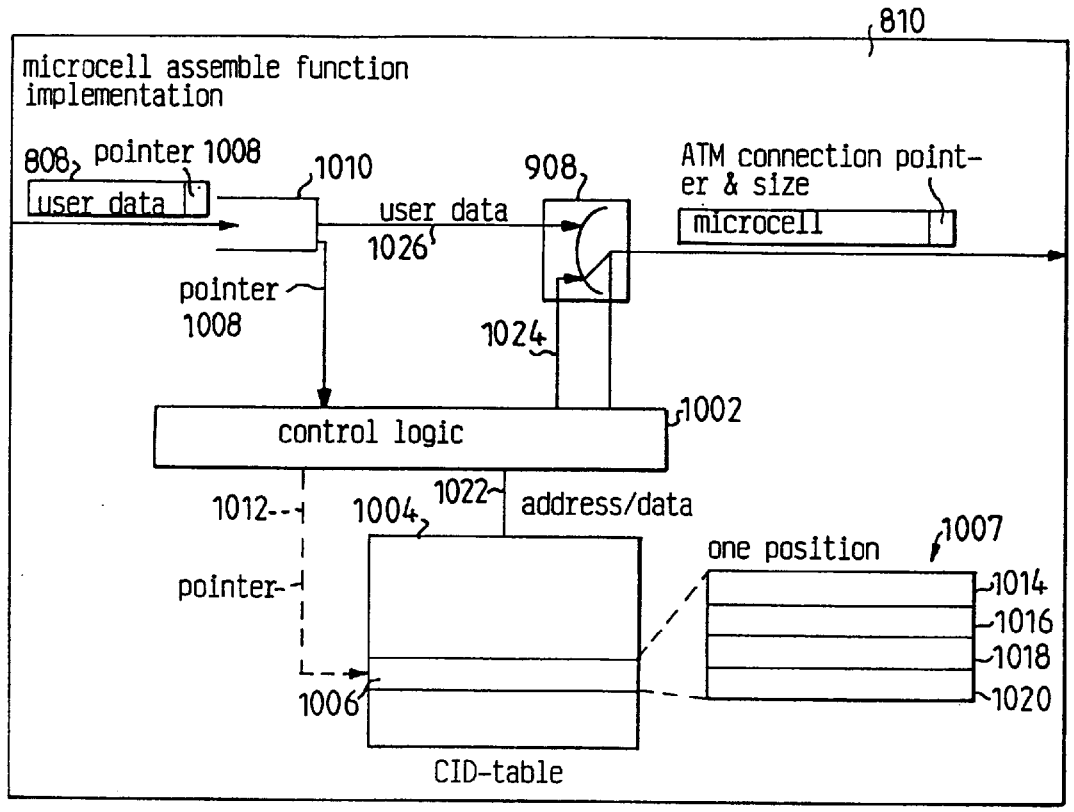

FIG. 10 schematically illustrates an implementation of the microcell assembling function. It includes control logic 1002 and data paths common to all microcell connections. The data needed for each connection are stored in a CID table 1004 containing one position for each connection, a specific one of these positions being indicated at 1006 together with an enlarged view thereof at 1007. Arriving user data 808 and an associated pointer 1008 is put into a FIFO 1010. The control logic 1002 is invoked. A simple implementation of the control logic 1002 can be a processor or specific hardware performing process steps to be described later on with reference to FIG. 11. The control logic 1002 receives the pointer 1008 from the FIFO 1010 and uses it to address, dashed arrow 1012, the relevant position 1006 in the CID table 1004.

Each position of the CID table 1004 includes all data and state variables needed for a microcell connection. Referring to the enlarged view 1007 of the position 1006 it can be categorized into four specific parts, viz. microcell header 1014, state variables 1016 for the connection, OAM microcell data 1018 and ATM connection pointer 1020 to an ATM VP/VC connection that shall carry the microcells.

First the control logic 1002 reads, indicated by connection 1022, the ATM connection pointer 1020 and microcell size, and thereupon the microcell header 1014 from the position 1006. The ATM connection pointer 1020 and the microcell header 1014 is fed, indicated by arrow 1024, to the multiplexer 908 which is used to assemble the microcell. After the ATM-connection pointer 1020 and the microcell header 1014 have been read out, the control logic 1002 shifts the multiplexer 908 towards the FIFO 1010 and the user data part 808 is added, indicated by arrow 1026, to the microcell by the multiplexer 908.

The size of user data is stored as one of the state variables 1016. The control logic 1002 also picks up, indicated by line 1022, and calculates OAM data 1018 and associated state variable data 1016 belonging to the connection. If an OAM-microcell shall be issued the control logic 1002 reads, line 1022, the entire OAM-microcell data contents 1018 from the position 1006. For determining whether an OAM-microcell shall be issued an OAM counter value and an OAM-microcell threshold included in the state variables 1016 are investigated by the control logic 1002.

Figure 11:
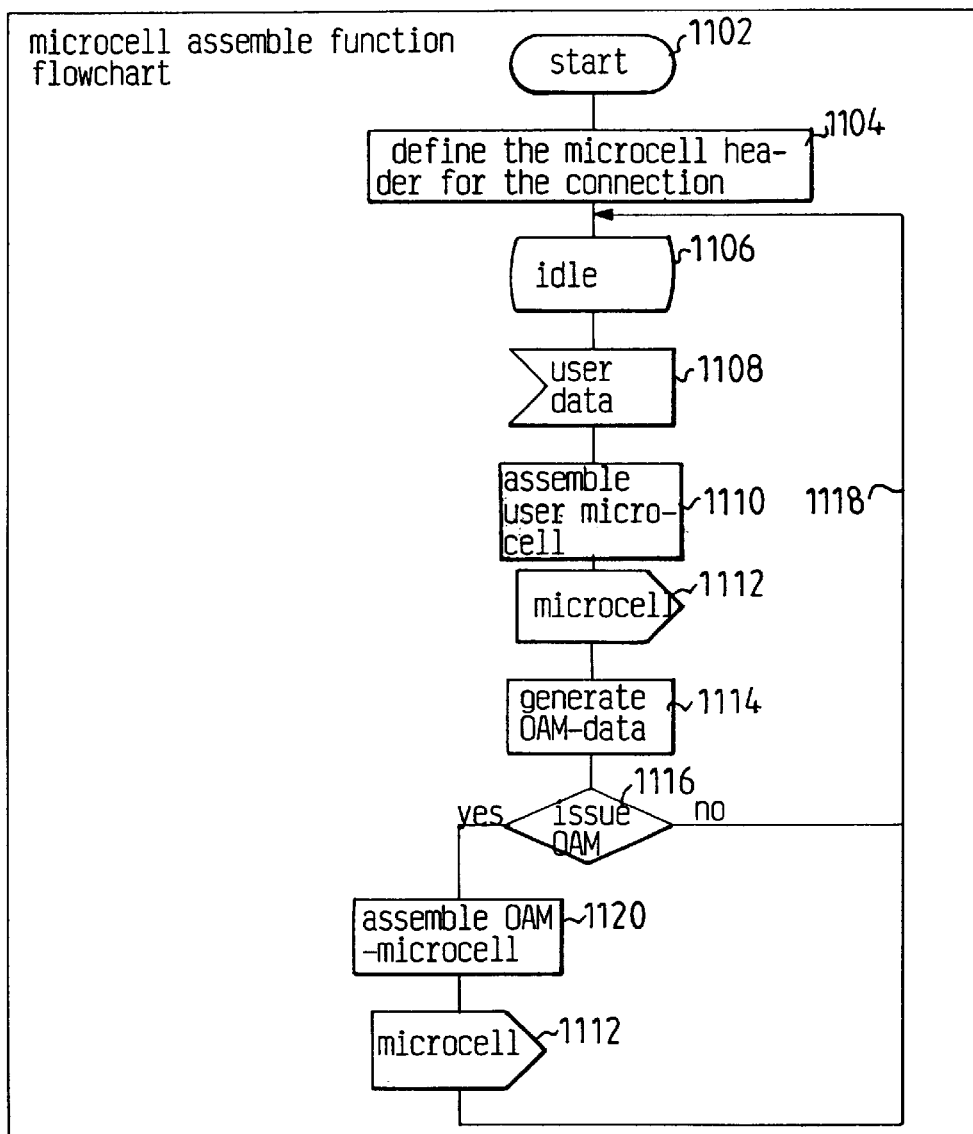
FIG. 11 is a flowchart illustrating assembling steps performed by the structure shown in FIG. 10, FIGS. 12, 13 and 14a–c schematically illustrate the way of operation of an ATM-cell assembling function included in the structure indicated by FIGS. 8–11.

FIG. 11 is a flowchart illustrating assembling steps performed by the structure described with reference to FIG. 10. The microcell assembling function 810 creates a process for each connection it handles. The process is created at connection establishment, step 1102, and killed at disconnection. The microcell header is defined, step 1104, at establishment. The process is normally in an idle state 1106 waiting for user data to appear. The user data arrival, indicated at 1108, activates the process. In step 1110 the user cell is assembled by picking up the microcell header for the connection and putting it in front of the user data as has been explained above. In step 1112 the assembled microcell is sent to the ATM-cell assembling function 814 together with the ATM connection pointer 1020.

In step 1114 accumulated OAM data is picked up and new OAM data is generated and stored. The accumulated value is added to user data value according to selected algorithms. An OAM-counter is incremented. In step 1116 the count value of the OAM counter is checked. If the OAM-counter has not reached the pre-defined OAM-cell threshold, the process returns to idle state 1106, arrow 1118. Otherwise the process proceeds to step 1120 in which the OAM-microcell is assembled and the accumulated OAM data is put in the payload of the OAM-microcell. In step 1122 the assembled OAM-microcell is sent to the ATM-cell assembling function 814 together with the ATM connection pointer 1020.

Figure 12:
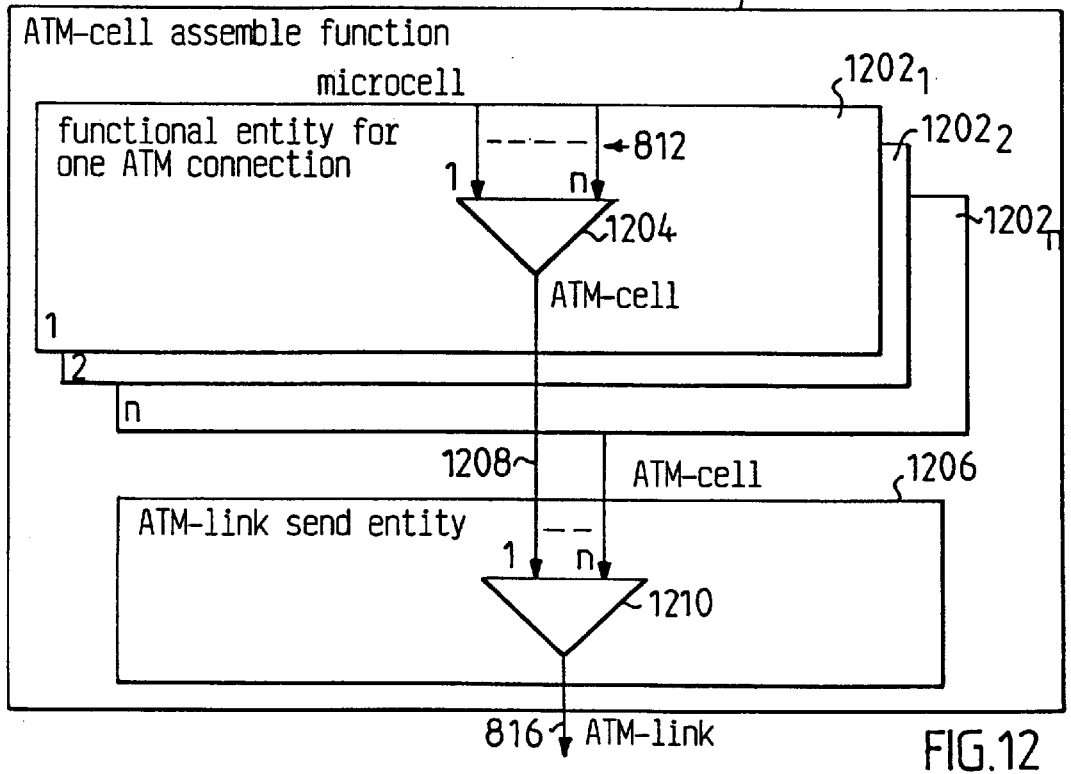
Figure 13:
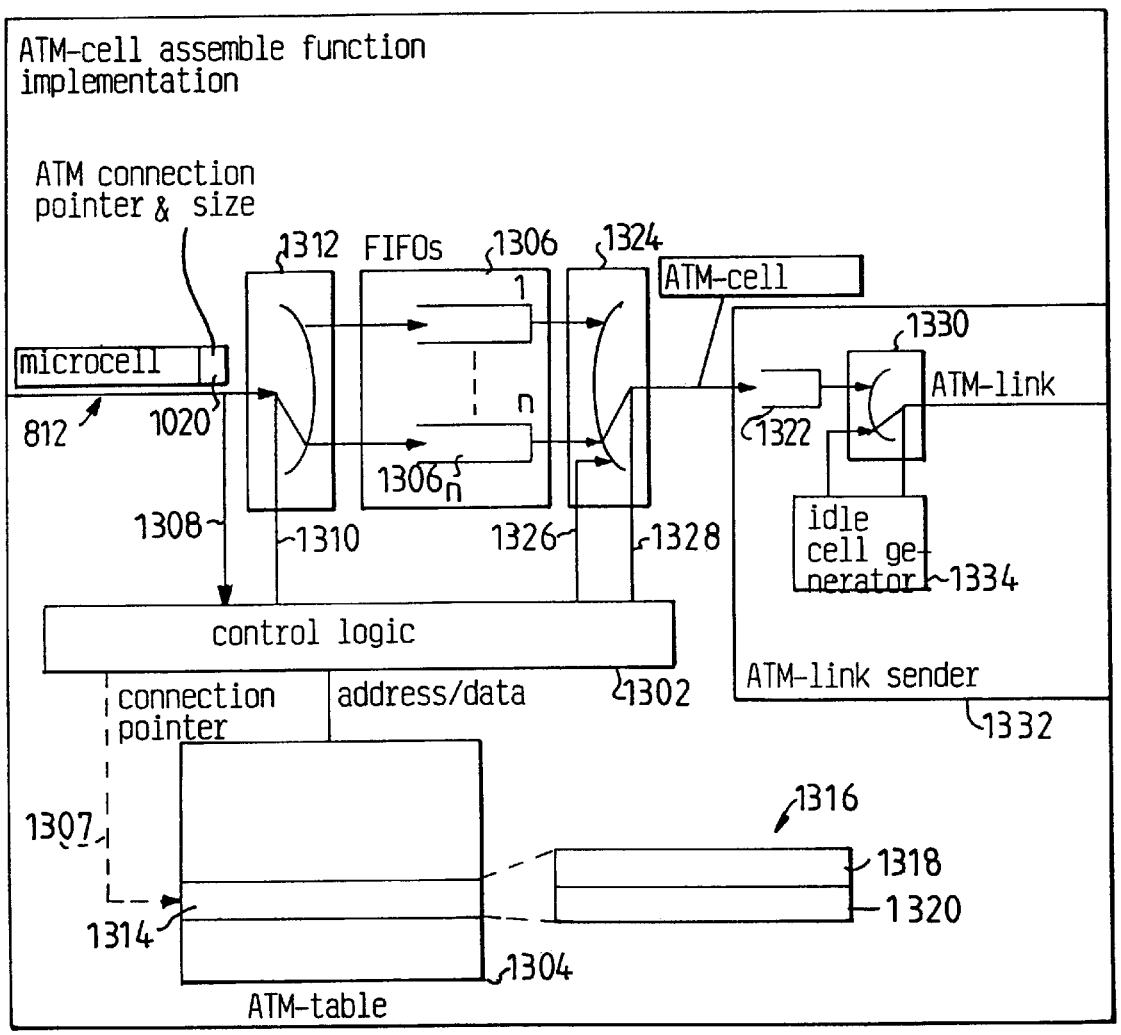

FIGS. 12, 13 and 14 are intended to illustrate the way of operation of the ATM-cell assembling function 814 on different levels of abstraction.

Referring to FIG. 12 there is created a functional entity $1202_{n-1}$ for each ATM connection. An entity is created when the ATM connection is established and removed when cleared. In the entities 1202 microcells coming from the microcell assembling function 810 are multiplexed at 1204 into the payload of assembled ATM-cells for the specific connection. When an ATM cell is fully assembled with microcells in its payload it is passed along to an ATM link send entity 1206. In the entity 1206 ATM-cells arriving as indicated at 1208 and belonging to different ATM connections, here depicted as 1 to n, are multiplexed in an ATM cell multiplexer 1210 and put on the ATM-link 816 as a continuous stream. In case of no ATM-cells as input to the multiplexer 1210 a so called idle ATM cell must be generated to maintain the ATM cell stream.

FIG. 13 schematically illustrates an examplary embodiment of the ATM cell assembling function 814. The function 814 includes control logic 1302 and data paths common to all ATM connections. The data needed for each connection are stored in an ATM table 1304, having one position for each ATM connection. The microcell of the microcell flow 812 arriving from the microcell assembling function 810 and its accompanying ATM connection pointer 1020 and microcell size invoke the control logic 1302. The control logic 1302 can be a processor or specific hardware performing processing steps to be described later on with respect to FIGS. 14a–c. The microcell is temporarily stored in one of a number of FIFOs 1306, one for each ATM-connection. The control logic 1302 picks up, arrow 1308, and uses the ATM connection pointer 1020 to identify and select, indicated by line 1310, the specific FIFO (1 to n) in question, indicated as $1306_n$ in FIG. 13. More particularly, the control logic 1302 uses and controls a demultiplexer 1312 to put the microcell in the FIFO $1306_n$. The control logic also uses the ATM connection pointer 1020 to address, arrow 1307, a relevant position in the ATM table 1304.

As mentioned earlier, the ATM-table 1304 holds one position for each ATM-connection, one specific position being indicated at 1314 together with an enlarged view at 1316. With reference to the view 1316, each position, such as the position 1314, contains the corresponding ATM header 1318 and state variables 1320 for the connection and assembling process.

Earlier three different assembling methods have been described with reference to FIGS. 4–5, 6 and 7, respectively. Depending on the method used the type of variables 1318 may differ. The type of variables that are needed for the different methods appear from a description below of flow charts in FIGS. 14*a–c*.

When the number of microcells stored in the FIFOs 1306 for the connection is sufficient to fill the ATM-cell payload according to the selected method, the ATM-cell is assembled and sent to a FIFO 1322 via a multiplexer 1324. This process is started by the ATM-header 1318 being read from the ATM-table 1304 and put on the ATM-link via an input 1326 to the multiplexer 1324. Immediately afterwards, the multiplexer 1324 is shifted to the FIFO 1306$_n$ belonging to the ATM connection in question and the FIFO is unloaded up to the point where the ATM-cell payload has been filled. Line 1328 indicates the control of the multiplexer 1324 by the control logic 1302 for attaining the shifting.

In case of the first method described above with reference to FIGS. 4 and 5, the microcell start pointer MSP is assembled by the control logic 1302 together with the parity bits P0 and P1 and put directly after the ATM-cell header as the first octet in the ATM-cell payload. The MSP is stored as a state variable 1320 the value of which can be calculated by the control logic in case of a divided microcell. The multiplexer input 1328 is used to insert the first octet.

In case of the second method described earlier with reference to FIG. 6 the PTI is modified accordingly in the header of the ATM cell.

In case of the third method described earlier with reference to FIG. 7 the remaining part of the ATM-cell payload is filled with an unassigned microcell by the control logic 1302.

The FIFO 1322 and a multiplexer 1330 form part of an ATM-link sender 1332 used for sending ATM-cells on the ATM-link 816. If an ATM-cell is present in the FIFO 1322 it is sent out on the ATM-link 816 through the multiplexer 1330. If no ATM-cell is present an idle ATM-cell is generated by an idle cell generator 1334 connected to the multiplexer 1330 and issued to maintain the ATM-cell stream on the ATM-link 816.

Figure 14A:
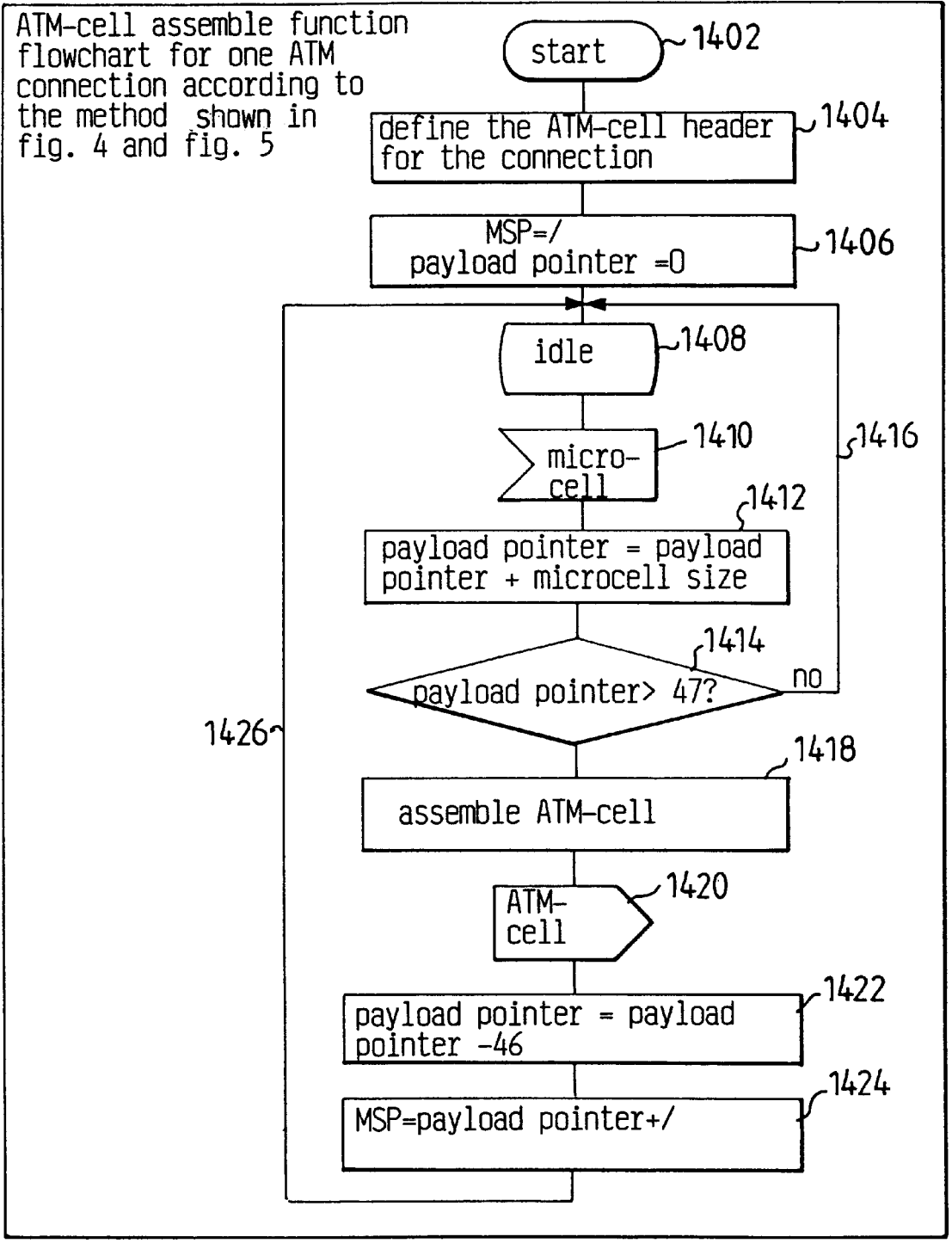

FIG. 14*a* is a flowchart illustrating the assembling steps performed by the structure described with reference to FIG. 13 when used for performing the method described with reference to FIGS. 4 and 5, according to which a microcell start pointer MSP is introduced into the first octet of the ATM-cell payload.

On establishment of the connection, step 1402, the ATM-header is defined, step 1404. At 1406 a state is indicated in which the MSP points to octet 1 in the ATM-cell payload. A payload pointer keeps track on current filling in the ATM-cell payload. Both the MSP and the payload pointer are stored as state variables 1320 in the position assigned for the connection in the ATM-table 1304. At 1408 an idle state is indicated in which the process is waiting for a microcell belonging to the connection to appear.

At 1410 arrival of a microcell sent in the flow 812 is indicated. Step 1412 adds current microcell size to the payload pointer. The payload pointer keeps track of current fill level in the ATM-cell payload. The ATM-cell is completely assembled when the payload pointer indicates that the fill level has exceeded the payload, i.e. 47 octets. Until that occurs a return to the idle state 1408 is made as indicated by the decision symbol 1414.

In step 1418 the ATM-cell is assembled according to the description above with reference to FIG. 13 and sent to the FIFO 1322. In step 1420 the ATM-cell in the FIFO 1322 will trigger a process to be described later on with reference to FIG. 15.

In step 1422 the payload pointer for assembly of the next ATM-cell belonging to the connection will be prepared. In step 1424 the MSP is set to point at the header start in the ATM-cell payload of next ATM-cell belonging to the connection followed by the process returning to state 1408 according to arrow 1426.

Figure 14B:
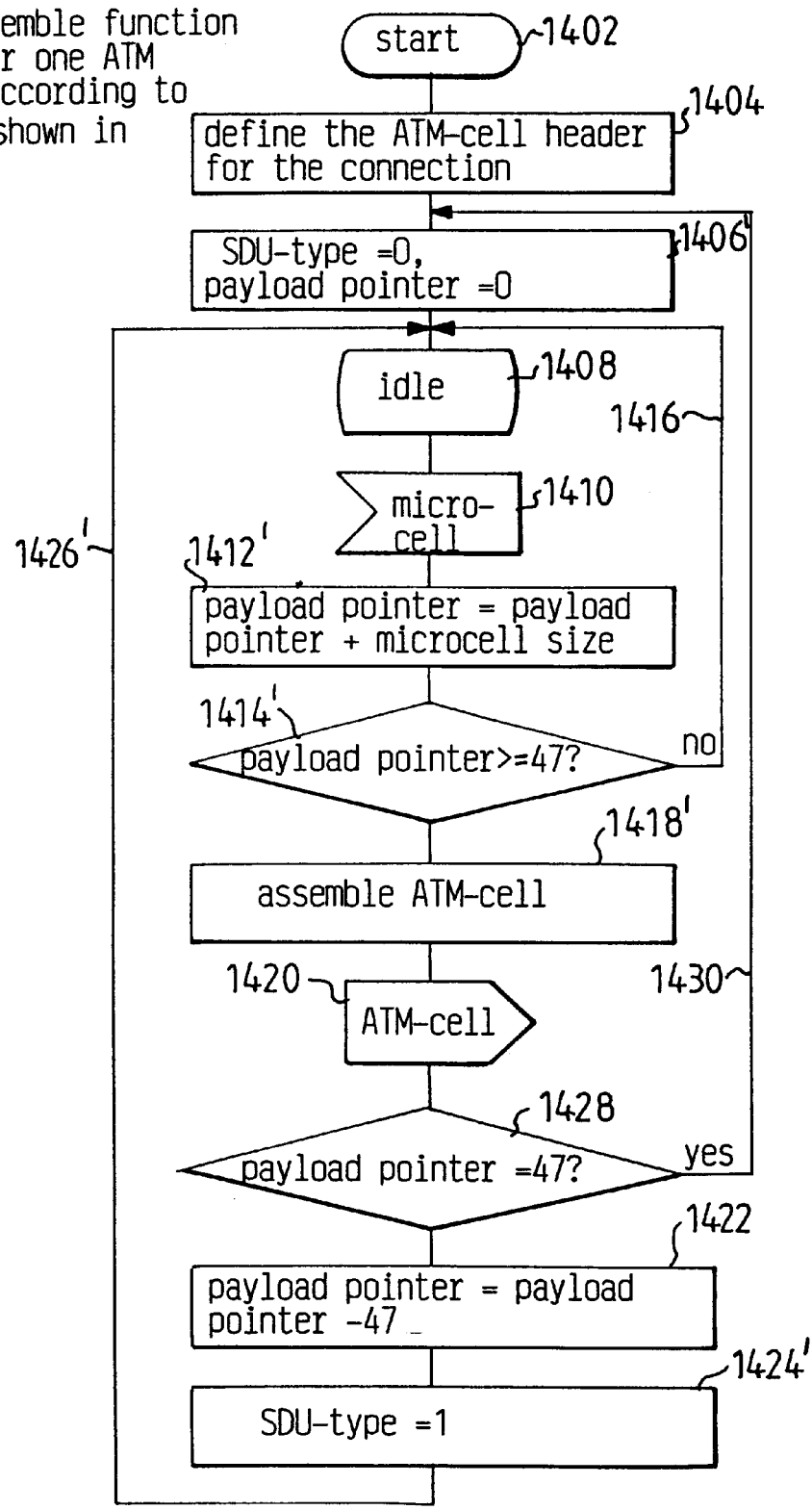

FIG. 14*b* is a flowchart illustrating the assembling steps performed by the structure described with reference to FIG. 13 when used for performing the method described with reference to FIG. 6. Since the flow is very similar to that of FIG. 14*a* the same reference numbers have been used to indicate steps and states identical with those of FIG. 14*a*. Steps and states modified as compared with some corresponding steps and states in FIG. 14*a*, or replacing such, have been indicated by the same reference number with the addition of a prime sign.

On establishment of the connection, step 1402, the ATM-header is defined, step 1404. At 1406' a state is indicated in which the SDU type indicates that the microcell starts in the first octet of the ATM-cell payload. A payload pointer keeps track on current filling in the ATM-cell payload. Both the SDU value and the payload pointer are stored as state variables 1320 in the position assigned for the connection in the ATM-table 1304. At 1408 an idle state is indicated in which the process is waiting for a microcell belonging to the connection to appear.

At 1410 arrival of a microcell sent in the flow 812 is indicated. Step 1412' adds current microcell size to the payload pointer. The payload pointer keeps track of current fill level in the ATM-cell payload. The ATM-cell is completely assembled when the payload pointer indicates that the fill level has reached or exceeded the payload, i.e. 47 octets. Until that occurs a return to the idle state 1408 is made as indicated by the decision symbol 1414'.

In step 1418' the ATM-cell is assembled according to the description above with reference to FIG. 13. The first 48 octets in the relevant FIFO 1306$_n$ are unloaded and sent to the FIFO 1322. The PTI-code in the ATM-cell header reflects current SDU type. The HEC in the ATM-cell header is recalculated accordingly by the control logic 1302. In step 1420 the ATM-cell in the FIFO 1322 will trigger a process to be described later on with reference to FIG. 15.

Step 1428 by "payload pointer=47?" checks whether the last microcell in the ATM-cell payload ends up even with ATM-cell payload, i.e. the last microcell octet is put in the last ATM-cell octet. If yes, the process returns according to arrow 1430 to step 1406' meaning that the next ATM-cell shall have the SDU-type set to 0 indicating that the ATM-cell payload starts with a new microcell. Thus, no overlapping occurs. Otherwise the process proceeds to step 1422 in which the payload pointer for assembly of the next ATM-cell belonging to the connection will be prepared by setting "payload pointer=payload pointer−47". In step 1424' the SDU-type is set to reflect that the next ATM-cell will start with a divided microcell, followed by the process returning to state 1408 according to arrow 1426'.

The described flow does not include functions that guarantees a new microcell start after a certain number of ATM-cells. A state variable for that purpose can, however, be incorporated in the memory area 1320 allocated for that purpose. If a counter used therefor exceeds the defined threshold, the remaining part of the ATM-cell will be populated with an unassigned microcell, so that next microcell will start in the first octet of the next ATM-cell.

Figure 14C:
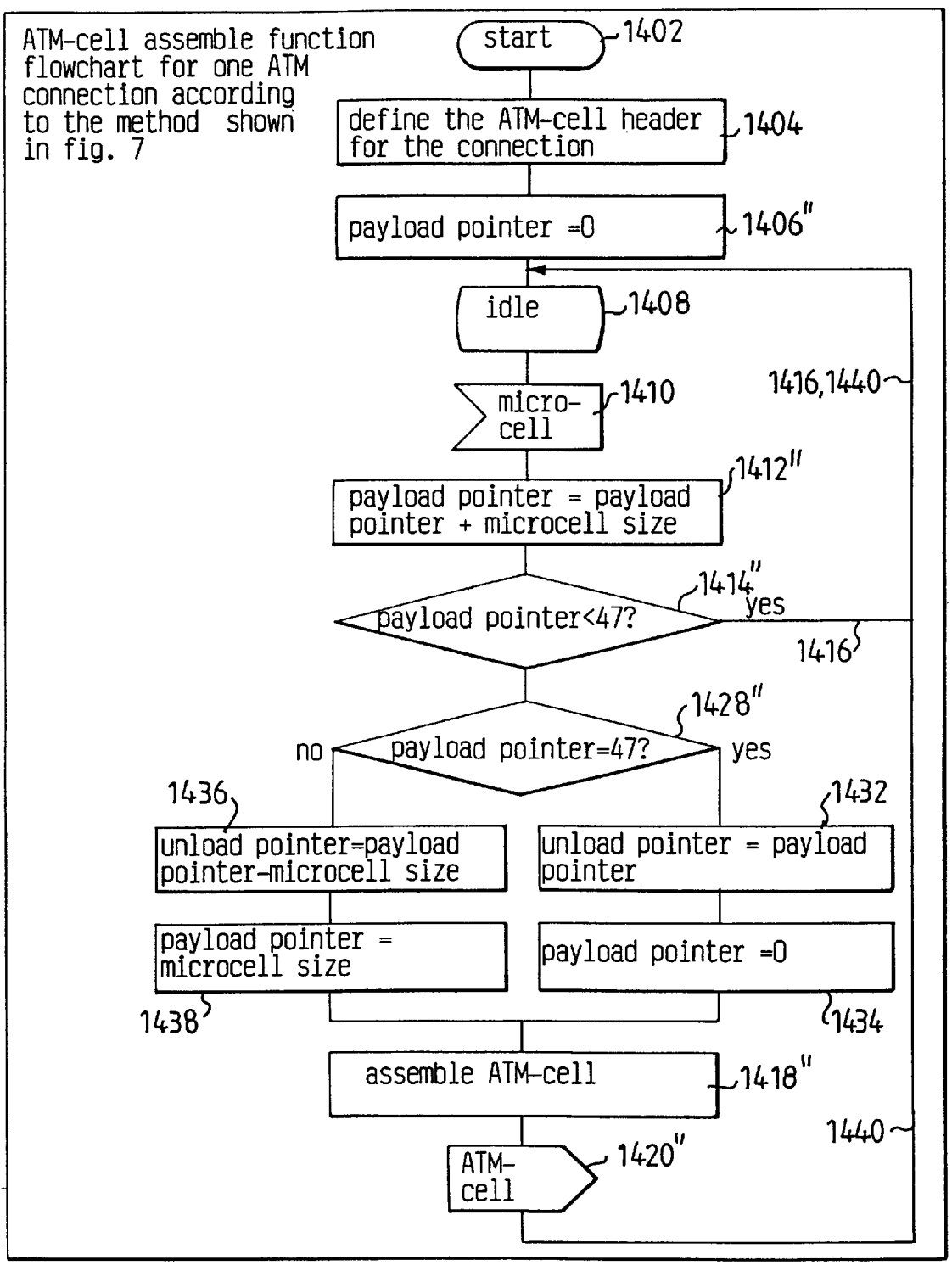

FIG. 14c is a flowchart illustrating the assembling steps performed by the structure described with reference to FIG. 13 when used for performing the third method described with reference to FIG. 7. Since the flow is similar to that of FIG. 14b the same reference numbers have been used to indicate steps and states identical with those of FIG. 14b. Steps and states modified as compared with some corresponding steps and states in FIG. 14b, or replacing such, have been indicated by the same reference number with the addition of a " sign.

The description that follows introduces a new state variable called "unload pointer". The purpose of the unload pointer is to indicate the number of octets that shall be collected from the FIFO 1302$_n$ in question. The unassigned microcell, filling the remaining part of the ATM-cell payload in accordance with the third method, is generated by the control logic 1302.

On establishment of the connection, step 1402, the ATM-header is defined, step 1404. At 1406" a state is indicated in which a payload pointer keeps track on current filling in the ATM-cell payload. The payload pointer is stored as a state variable 1320 in the position assigned for the connection in the ATM-table 1304. AT 1408 an idle state is indicated in which the process is waiting for a microcell belonging to the connection to appear.

At 1410 arrival of a microcell sent in the flow 812 is indicated. Step 1412" adds current microcell size to the payload pointer. The payload pointer keeps track of current fill level in the ATM-cell. The ATM-cell is completely assembled when the payload pointer indicates that the fill level has reached the payload, i.e. 47 octets. Until that occurs a return to the idle state 1408 is made as indicated by the decision symbol 1414".

In step 1428" it is investigated whether the last microcell in the ATM-cell ends up even with ATM-cell payload. In this case an unload pointer is needed for investigating whether an unassigned microcell shall be used to fill the remaining part of the ATM-cell payload. In case the last microcell evens up with the ATM-cell, step 1432 sets the unload pointer to the value of the payload pointer. In step 1434 the payload pointer is then set to zero to indicate that the next microcell shall be put in the next ATM-cell.

In case the current microcell, i.e. the one that arrived in step 1410, does not fit in the current ATM-cell it must be put on hold and put in the next ATM-cell. In step 1436 the unload pointer now indicates that the FIFO 1306, in which the microcells are stored, can only be unloaded up to the last microcell, thus leaving it in the FIFO 1306. In step 1438 the payload pointer is updated to the microcell size that had to remain in the FIFO, thereby being able to fill next ATM-cell properly. In the ATM assembling step 1418" the space from the unload pointer to the last octet in the current microcell will be filled with an unassigned microcell.

In step 1418" the ATM-cell is assembled according to the description above with reference to FIG. 13. The first 48 octets in the relevant FIFO 1306$_n$ are unloaded and sent to the FIFO 1322. In step 1420" the ATM-cell in the FIFO 1322 will trigger a process to be described later on with reference to FIG. 15. The flow of FIG. 13c is repeated from idle state 1408 as indicated by arrow 1440.

Figure 15:
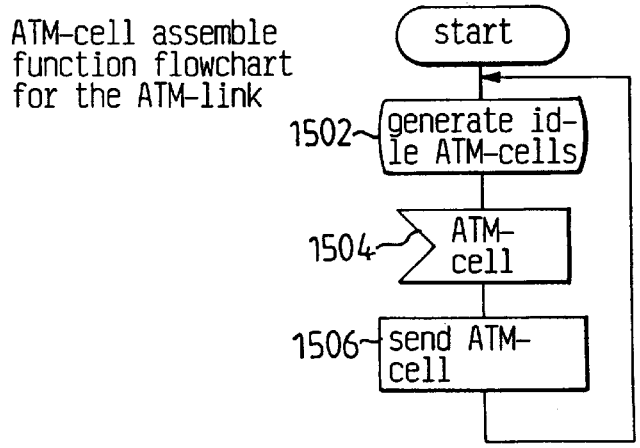
FIG. 15 is a flowchart illustrating the ATM-link handling in the ATM-cell assembling function, FIG. 16 schematically illustrates the basic functionality of an ATM-cell disassembling function and microcell disassembling function included in FIG. 8, FIG. 17 more in detail, although still schematically, illustrates an examplary embodiment of the structure illustrated in FIG. 16.

FIG. 15 is a flowchart illustrating the steps needed to maintain an ATM-cell stream on the ATM-link 816. If a user ATM-cell results from the flows described with reference to FIGS. 14a–c, that ATM-cell is sent, otherwise idle cells are generated and issued, steps 1502–1506. The flow corresponds to the functionality described for the ATM-link sender 1332.

Figure 16:
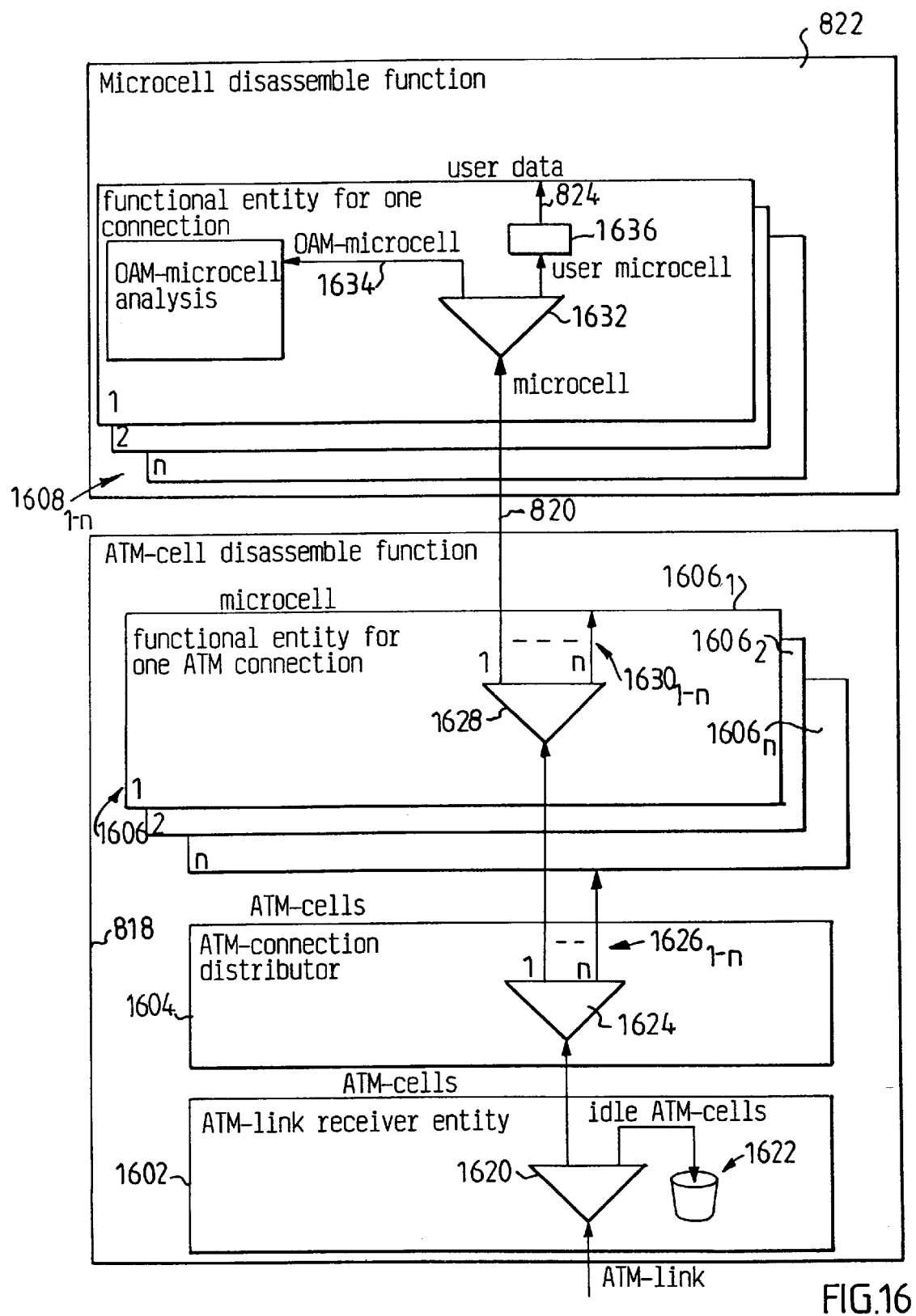

FIG. 16 schematically illustrates the basic functionality of the ATM-cell disassembling function 818 and microcell disassembling function 822. The incoming ATM-cell stream 816 is demultiplexed in several stages 1602, 1604 and 1606 until microcells for individual connections are identified in the ATM-cell disassembling function. Each microcell connection has its own functional entity 1608$_{1-n}$ in the microcell disassembling function 822. The output from each functional entity is user data 824 presented to the application functionality 826.

The stage 1602 is an ATM-link receiver entity aligning the incoming ATM-cell stream, i.e. finds the ATM-cell boundaries and separates idle ATM-cells from user ATM-cells by means of a demultiplexer 1620. The idle ATM-cells are wasted as indicated at 1622.

The stage 1604 is an ATM connection distributor to which the user assigned ATM-cells are transferred. The ATM connection distributor 1604 separates each ATM connection by means of a demultiplexer 1624 having one output 1626$_{1-n}$ for each ATM connection.

Stage 1606 comprises a number of functional entities 1606$_{1-n}$ for each a specific ATM connection. The ATM-cells belonging to a specific ATM connection are transferred to the relevant functional entity 1606$_n$ which is created at connection establishment. The functional entity disassembles the ATM-cell and separates microcells for each microcell connection by means of a demultiplexer 1628 having one output 1630$_{1-n}$ for each microcell connection. There are also functions to align the incoming microcell stream according to the three methods described in FIGS. 4–5, 6 and 7.

The number of microcell disassembling function entities 1608$_{1-n}$ in the microcell disassembling function 822 is the same as the number of ATM-connections multiplied with the number of microcell connections that are multiplexed on each ATM connection. Each entity 1608 is established at connection establishment and removed when the connection is cleared.

Each entity 1608 has a demultiplexer 1632 separating OAM-microcells from user assigned microcells, indicated at 1634. The user microcell header is removed, indicated at 1636, and the resulting user data 824 is presented to the application 826. In case of an OAM-microcell the content is analyzed in an OAM-microcell analysis function 1638.

Figure 17:
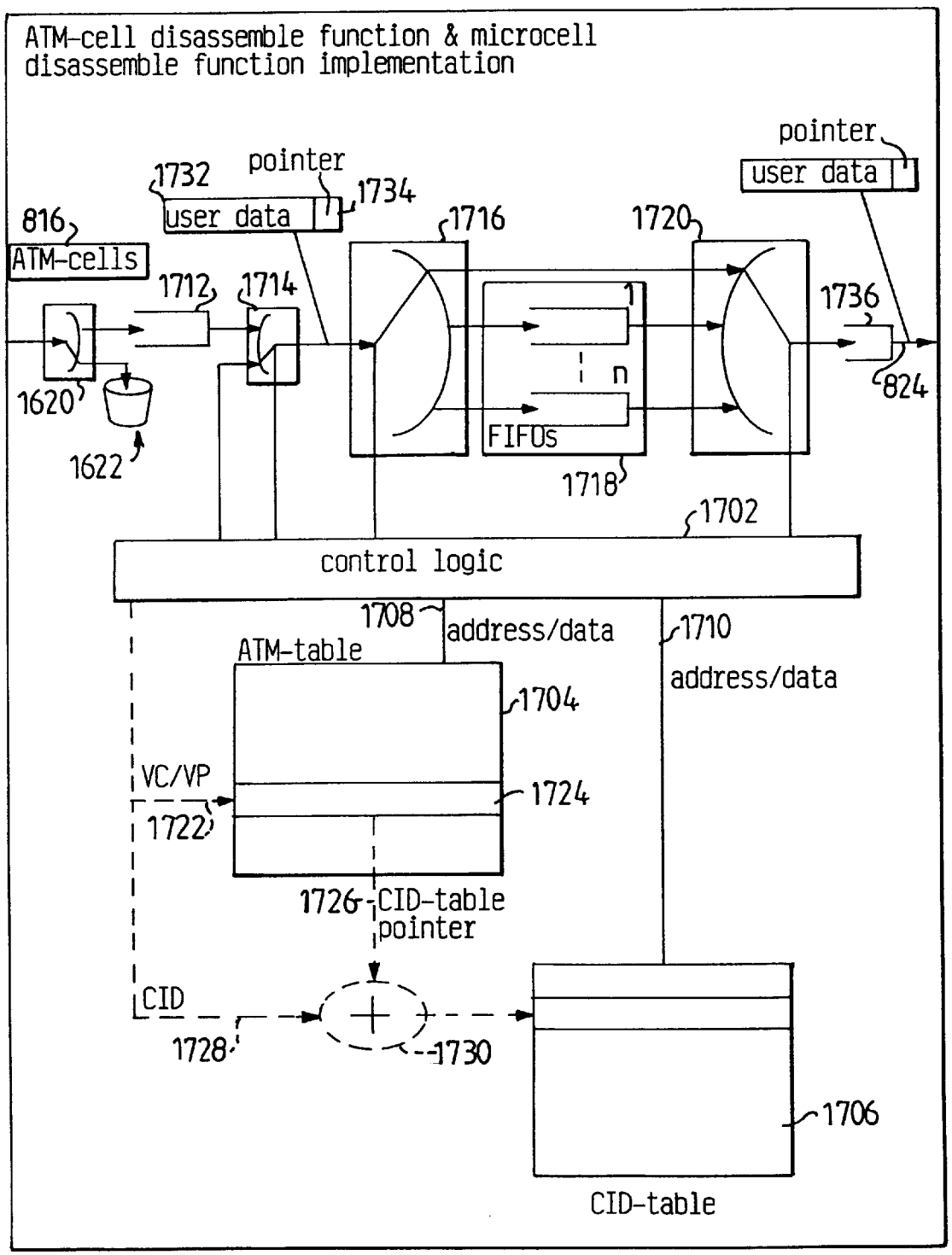

FIG. 17 more in detail, although still schematically, illustrates an examplary embodiment of the ATM-cell disassembling function 818 and the microcell disassembling function 822. The data flow from the incoming ATM-link 816 to the application 826 as well as the disassembling operations are controlled by a control logic 1702 that can be a processor or specific hardware. The control logic 1702 uses data for the ATM connection stored in ATM-table 1704, and data for the microcell connections stored in a CID-table 1706 to distinguish between the different processes that are established for the connections. The control logic 1702 accesses the data of the tables 1704 and 1706 by means of address and data lines 1708 and 1710, respectively.

The user ATM-cells leaving the demultiplexer 1620 are temporarily stored in a FIFO 1712. Meanwhile the ATM-header is read from the FIFO 1712 to the control logic 1702 by means of a multiplexer 1714. The multiplexer 1714 supports most of the disassembly functions. It has two basic functions, one being to extract the ATM header and microcell headers, respectively, when they are read from the FIFO 1714 and pass the microcell user data along to a demultiplexer 1716. The second function is to insert the pointer to the user data, cf. step 1110 in FIG. 11.

The demultiplexer 1716, a FIFO array 1718 and a multiplexer 1720 are used to manage divided microcells according to the methods described earlier with reference to FIGS. 4–5 and 6. In the case of the third method described with reference to FIG. 7 these functions are not needed.

As mentioned above the multiplexer 1714 and the control logic 1702 perform the basic disassembling functions. In order to find the stored data for the ATM-connection and microcell connection in question the ATM-table 1704 and the CID-table 1706 are used, respectively.

The VC/VP identifying the ATM connection is used to address the relevant position 1724 in the ATM-table 1704 as indicated by dashed arrow 1722. Every established ATM connection has a position in the ATM-table. Each position in the ATM-table holds state variables for the connection it represents. The specific usage of the variables will appear from the description later on with reference to flowcharts shown in FIGS. 18–19. The state variables in each position in the ATM-table 1704, such as position 1724, includes a CID-table pointer 1726, giving the start address to the microcell connection assigned to the ATM connection.

disassemble state, indicating if a divided microcell is currently processed, needed for the multiplexing methods according to FIGS. 4–5 and 6.

State parameters needed to be temporarily stored are CID, OAM-microcell, remaining microcell size for the method according to FIG. 6, and FIFO pointer. The sole purpose of the FIFO pointer is to identify where the first part of the microcell is stored in case of a divided microcell. A divided microcell is temporarily stored in the FIFO array 1718. In the FIFO array 1718 one FIFO is needed for each ATM connection.

The CID-table pointer is added to current CID, indicated by dashed arrow 1728 by means of an adder indicated at 1730 although of course the real addition is made in the control logic 1702. Each microcell connection has a position, one being indicated at 1732, in the CID-table 1706. This position holds the data and state variables needed to maintain the microcell connection. They are assigned microcell size, OAM accumulated check data and user data pointer, respectively. The user data pointer makes possible delivering of user data to the application assigned to the microcell connection. The way of providing assigned microcell size information here by means of a table is an alternative to using a microcell size indicator in the microcell header as described earlier with reference to FIG. 4a.

By using the information stored in the tables 1704 and 1706, user data and a pointer, indicated at 1732 and 1734, respectively, are obtained from the multiplexer 1714. If the user data is complete, meaning that the microcell is not divided, the control logic 1702 transfers the user data 1732 and pointer 1734 directly to an output FIFO 1736. If the microcell is divided, the pointer and a first part of the user data are temporarily stored in the specific FIFO assigned to the ATM-connection in the FIFO array 1718. The demultiplexer 1716 is used for this purpose. When the last part of the user data appears, it is added to the FIFO in question. When complete, the pointer and user data are unloaded from the assigned FIFO by means of the multiplexer 1720 and stored in the FIFO 1736. The output FIFO 1736 may be needed to accommodate rate differences that can occur during the disassembling process. When the complete user data is loaded into the FIFO 1736 the application attached to the microcell connection in question will be invoked and the FIFO 1736 is unloaded.

During the disassembling process OAM-data is accumulated and stored in the position assigned to the connection in the CID-table. When an OAM-microcell appears, its contents is compared with the accumulated data. The OAM-microcell is therefore not passed along after the. multiplexer 1714. It is completely consumed by the control logic 1702.

Figure 18:
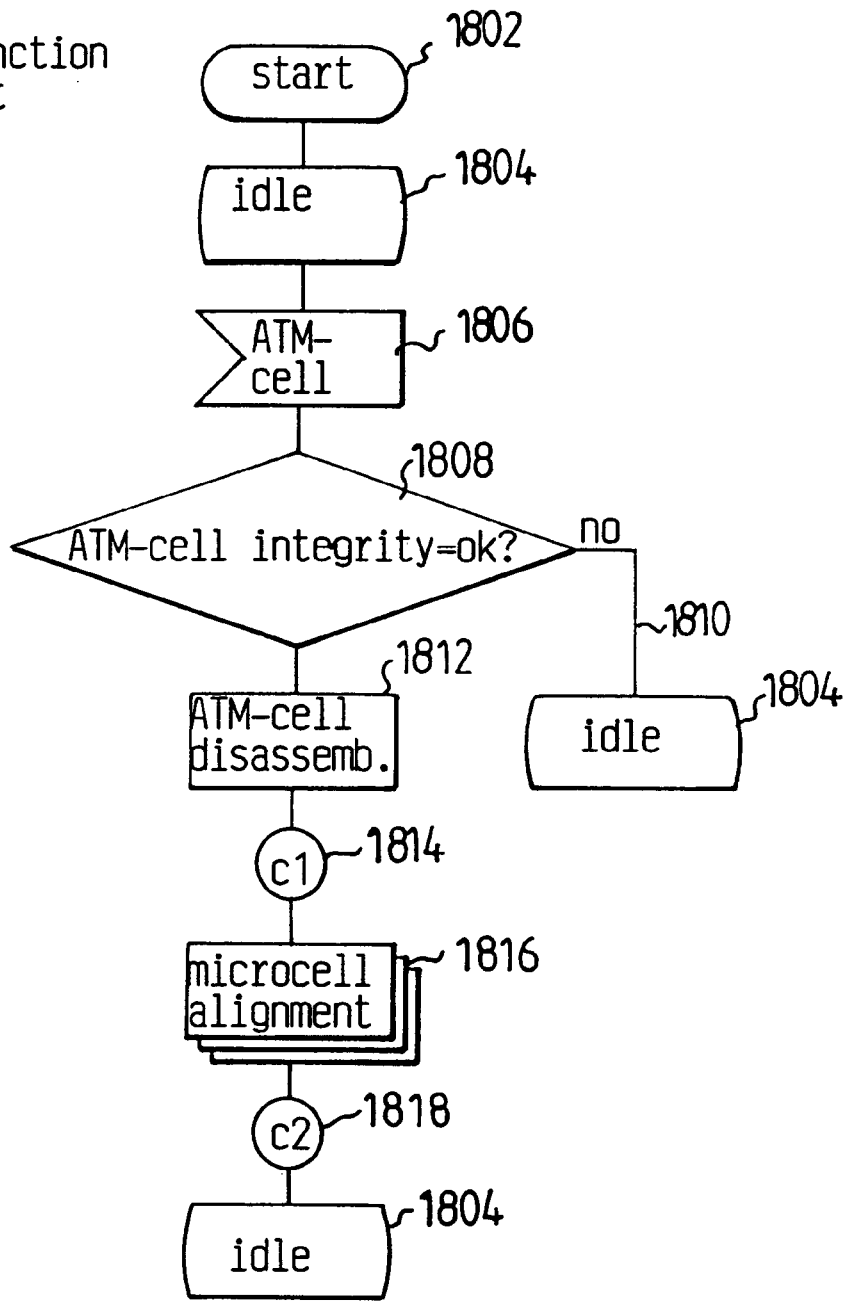
FIG. 18 is a basic flowchart illustrating the disassembling process of the functionality of FIG. 16, FIGS. 19a–c are flowcharts illustrating disassembling microcells aligned in accordance with the methods described with reference to FIGS. 4 and 5, 6 and 7, respectively.

FIG. 18 is a basic flowchart illustrating the disassembling process.

At start, step 1802, functions are used for establishing ATM and microcell connections, i.e. loading configuration data into the ATM-table 1704 and CID-table 1706. The symbol 1804 "idle" indicates a state waiting for an ATM-cell to arrive. In step 1806 an ATM-cell arrives in the FIFO 1712 and the control logic 1702 is invoked. In step 1808 an integrity check is made of the ATM-cell header according to HEC and that the VP/VC is valid, i.e. belongs to an established ATM-connection. If the integrity check fails, the entire ATM-cell is deleted and a return to the idle state 1804 is made.

In step 1812 the ATM-cell header is removed so that the microcell disassembly process can start. The symbols 1814 and 1818 indicate connection points to more detailed flowcharts of the microcell alignment flow shown in FIGS. 19a–c.

In step 1816 the microcell alignment function aligns the microcells and disassembles each microcell separately until all of the ATM-cell payload is run through. Dependent of method according to that described with reference to FIGS. 4–5, 6 and 7, different alignment methods are applied. These alignment methods are described in FIGS. 19a, b and c, respectively.

Figure 19A:
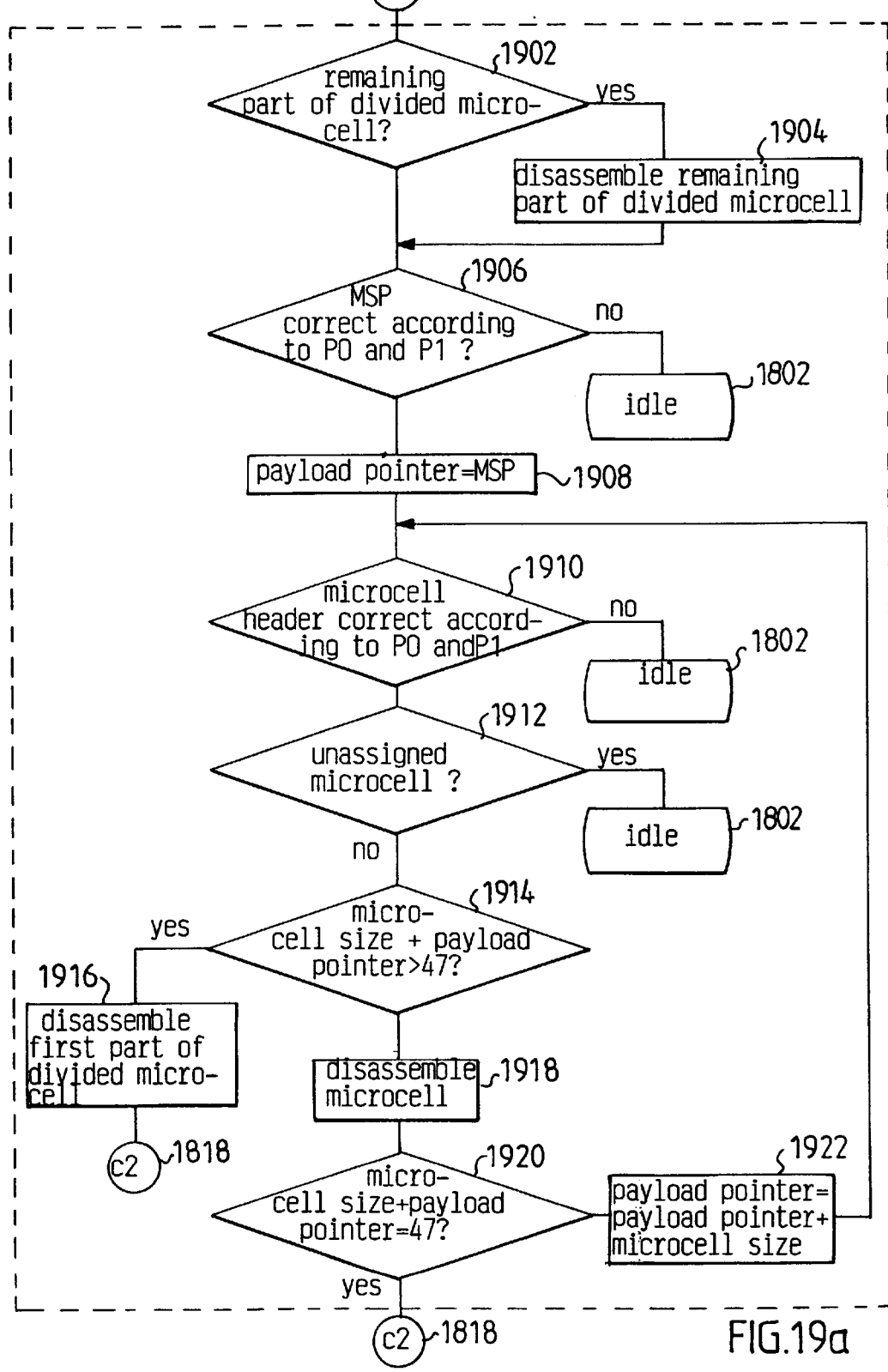

FIG. 19a is a flowchart illustrating disassembly of microcells aligned in accordance with the method described with reference to FIGS. 4 and 5.

In step 1902 a check is made to see if a current microcell is divided, i.e. if the existence of an already disassembled part is indicated in the ATM-table. If yes, the disassembling process is resumed in step 1904. Relevant data needed to proceed is fetched from the ATM-table 1704 and CID-table 1706.

In step 1906 a check is made on the MSP integrity, i.e. it is investigated whether the MSP is correct according to P0 and P1. If not correct the idle state 1802 is entered.

In step 1908 the payload pointer is set to the MSP. The payload pointer is a variable used to keep track of current position in the ATM-cell payload, thereby making sure by tests that the ATM-cell payload limit of 48 octets is not exceeded. By doing this the microcell stream is realigned regardless.

In step 1910 microcell header integrity is checked, i.e. it is investigated whether the microcell header is correct according to P0 and P1. If not correct the idle state is entered.

In step 1912 it is checked whether there is an unassigned microcell. In case of an unassigned microcell the idle state 1802 is entered. Unassigned microcell indicates that it is the last microcell in current ATM-cell, filling the remaining part of the ATM-cell payload from where it starts to the last octet of current ATM-cell. The unassigned microcell contains no user data and can therefore be wasted.

In step 1914 it is checked whether next microcell is contained completely in the current ATM-cell. If yes, the flow proceeds to step 1916, in which the part contained in this ATM-cell is disassembled and relevant parameters are stored so the disassembly process can be resumed when the remaining part appears. The process ends in point 1818.

In step 1918 the whole microcell is disassembled.

In step 1920 it is checked whether the current microcell evens up with the ATM-cell payload. If no, step 1922 prepares for disassembling the next microcell contained in current ATM-cell payload, and the process returns to step 1910. If yes, the process ends in point 1818.

Figure 19B:
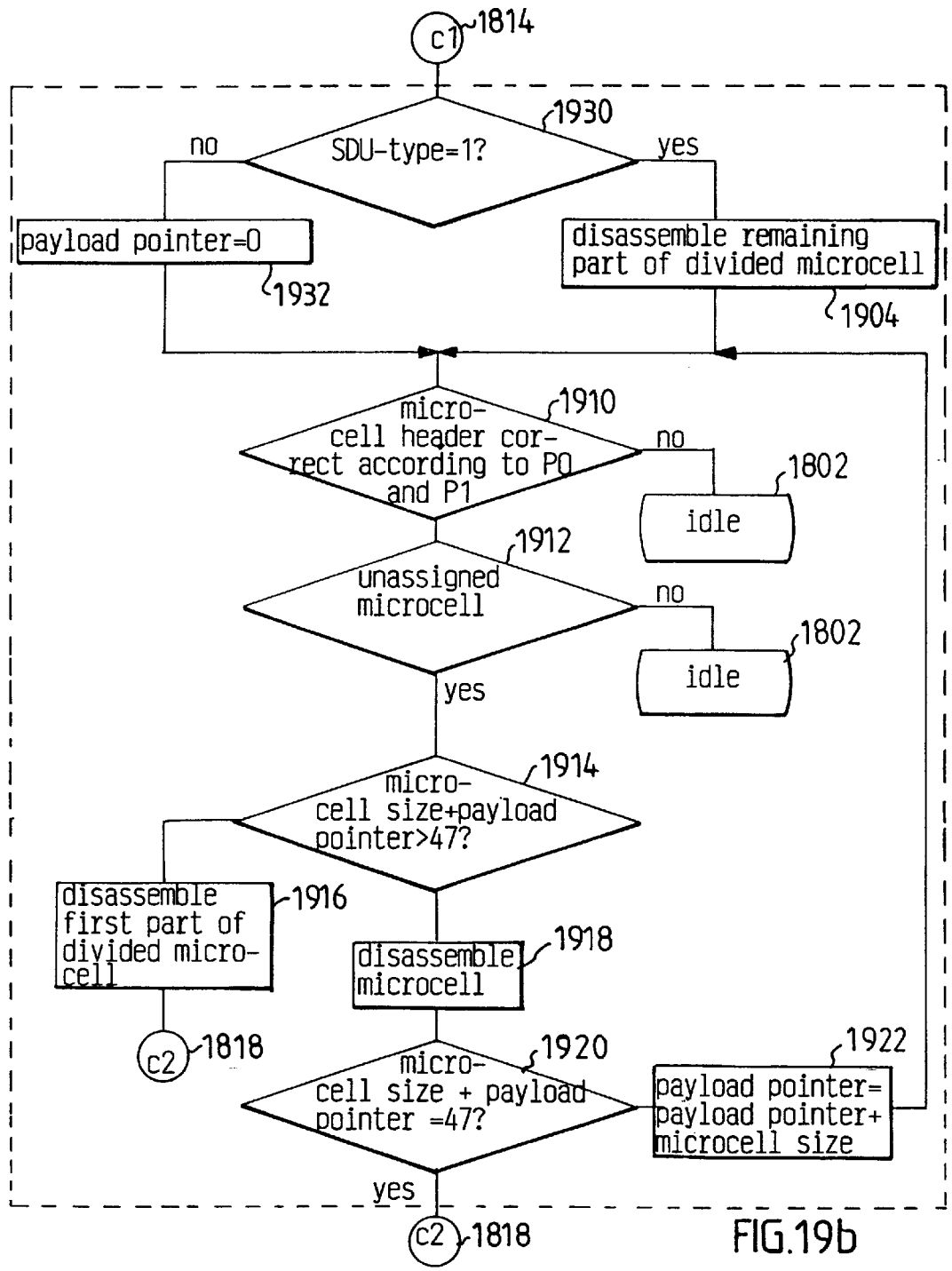

FIG. 19b is a flowchart illustrating disassembly of microcells aligned according to the method described with reference to FIG. 6.

In step 1930 a check is made as to whether SDU-type=1, i.e. if the current ATM-cell starts with a new microcell in the first payload octet. If no, the payload pointer is set to 0 in step 1932. The payload pointer function is explained above with reference FIG. 19a, step 1908. If yes, the same step 1904 as in FIG. 19a follows. This step 1904 or step 1932 are then followed by the same steps 1910–1922 as described with reference to FIG. 19a.

Figure 19C:
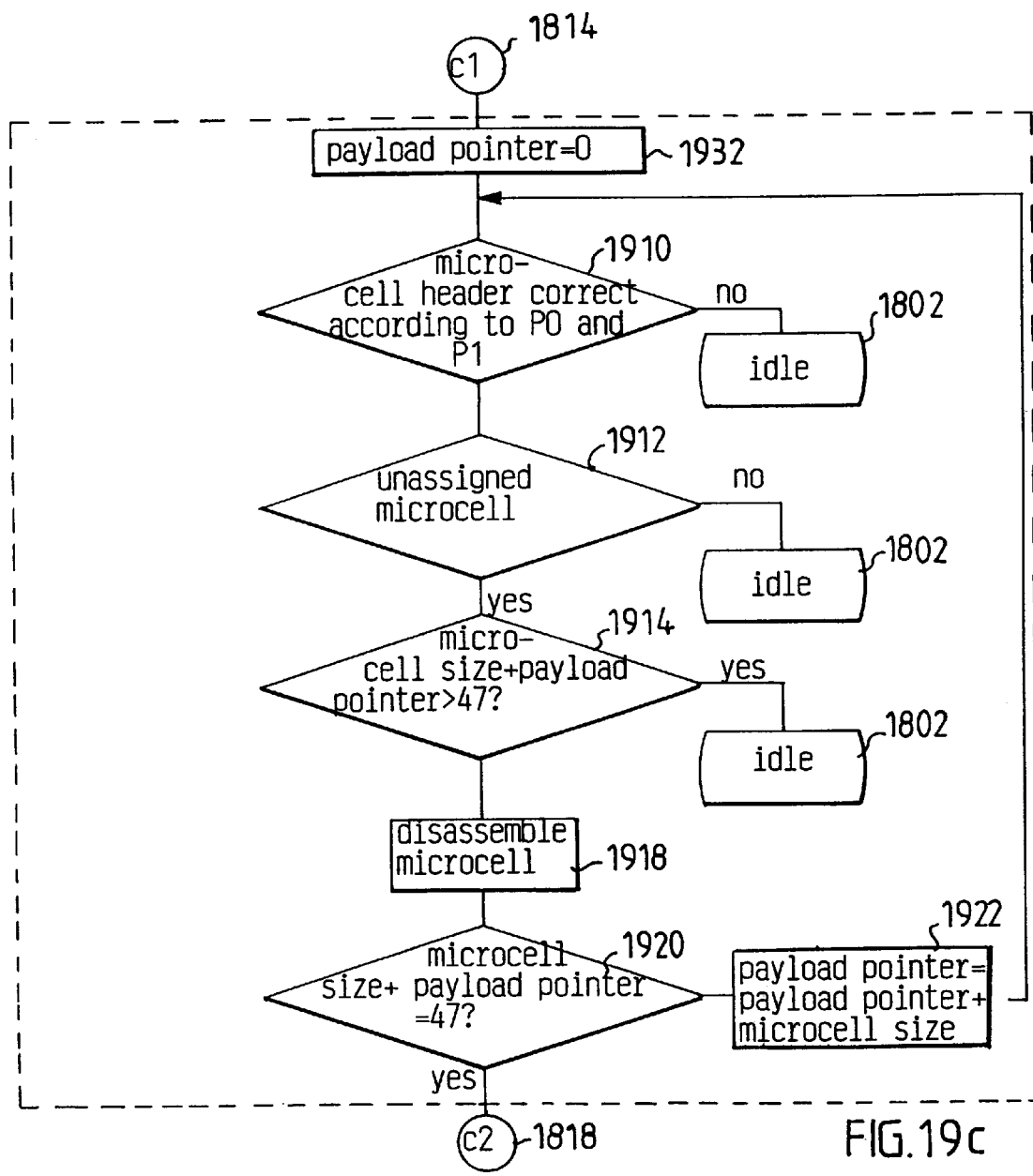

FIG. 19c is a flowchart illustrating disassembly of microcells aligned according to the method described with reference to FIG. 7.

The first step is the same as step 1932 in FIG. 19b, i.e. the payload pointer is set to 0. The payload pointer function is explained above with reference FIG. 19a, step 1908.

The following steps are the same as steps 1910–1922 in FIG. 19a with the difference that step 1916 has been replaced with step 1802, i.e. if yes in step 1914, the idle state is entered.

Figure 20A:
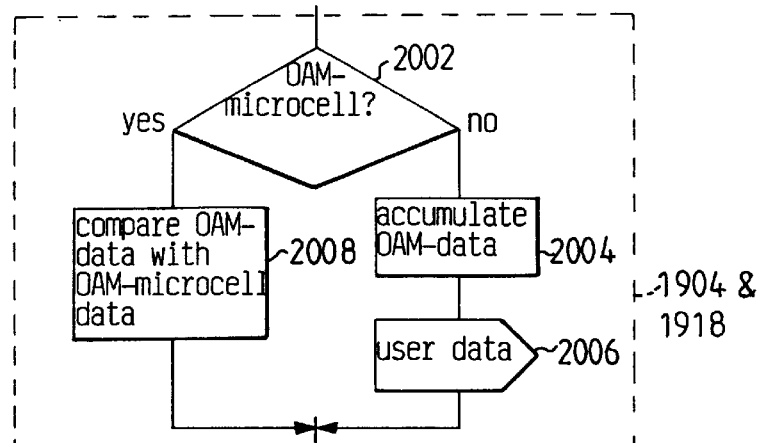

FIG. 20a is a flowchart illustrating in more detail step 1904 in FIGS. 19a and 19b and step 1918 in FIGS. 19a, 19b and 19c. In a first step 2002 it is checked whether the microcell header or, alternatively, the stored data in the ATM-table for a divided microcell indicates an OAM-microcell or not. If no, OAM data is accumulated in step 2004 so as to enable it to be compared when an OAM-microcell appears that belongs to the connection in question. This is followed by step 2006 in which the user data is transported to the FIFO 1736 and the application is invoked. If yes in step 2002, step 2008 follows in which the data provided in the OAM-microcell is compared with the accumulated OAM-data from the preceding user microcells belonging to the same microcell connection.

Figure 20B:
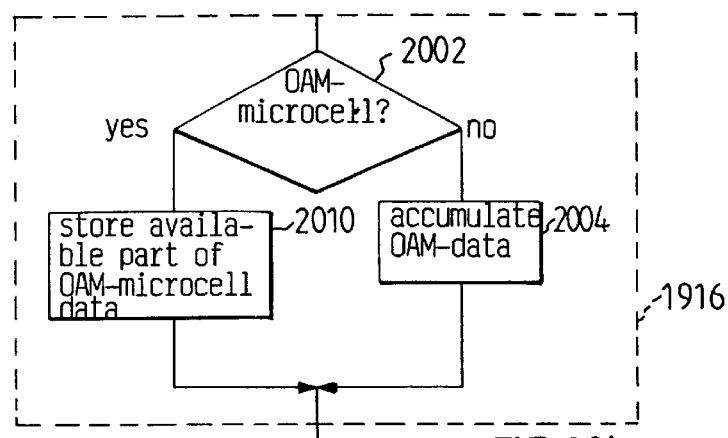

FIG. 20b is a flowchart illustrating step 1916 in FIGS. 19a and 19b in which only the first part of a divided microcell is disassembled. Steps 2002 and 2004 are the same as in FIG. 20a. If yes in step 2002, the available user data is stored in step 2010 in the FIFO 1718 assigned to the ATM connection.

Figure 21:
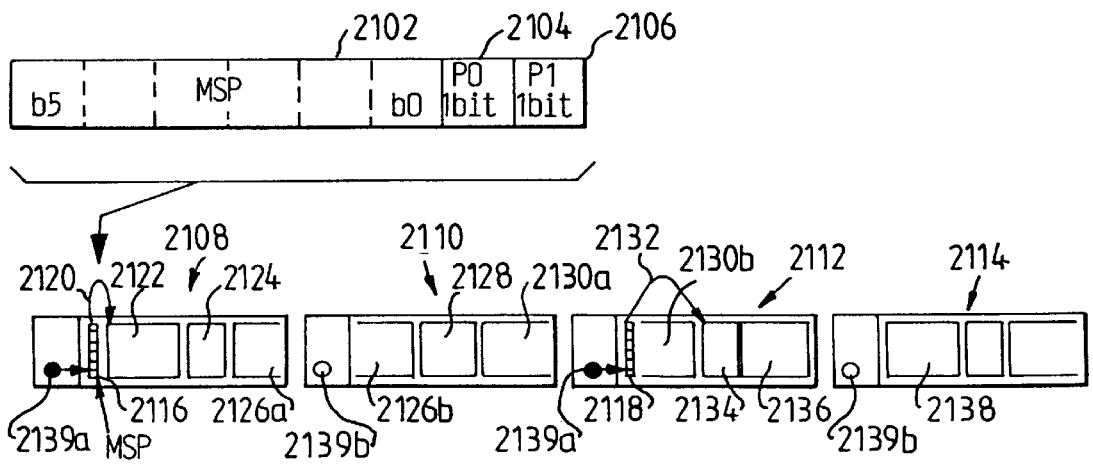

FIG. 21 in views similar to those of FIG. 4 illustrates basic principles of a fourth alignment method. The method uses, as in the first method according to FIG. 4, a microcell start pointer 2102, MSP, together with two parity bits 2104 and 2106 for integrity, to align microcells in an ATM-cell payload. The MSP can be inserted at intervals, i.e. once every n-th microcell, determined by the sending entity.

By issuing the MSP only at certain intervals a bandwidth gain can be obtained. On poor ATM connections the MSP can be issued more frequently, e.g. down to once for every ATM-cell. On high quality ATM-connections the MSP can be issued, e.g. once every 32:nd ATM-cell. Thus saving link bandwidth. To issue a MSP for every ATM-cell costs approximately 2% of the bandwidth, assuming that the MSP together with the parity bits occupy one octet. By only issuing a MSP every 32:nd ATM-cell the bandwidth cost is less than 0.1%.

The SDU-types 0 and 1 located in the header of each ATM cell are used to indicate whether the first octet in the ATM cell contains an MSP or a microcell, respectively.

Four consecutive ATM-cells are indicated at 2108, 2110, 2112 and 2114. As an example MSPs are issued in every second ATM-cell, viz. the ATM-cells 2108 and 2112, the MSPs of which are indicated at 2116 and 2118, respectively. In the ATM-cell 2108 the MSP 2116 points in accordance with arrow 2120 at a microcell 2122 starting in the second octet of the ATM-cell payload. A further microcell is indicated at 2124. The ATM-cell 2108 also contains a divided microcell indicated 2126a which continues in the ATM-cell 2110 indicated at 2126b. Since the ATM-cell 2110 does not contain any MSP, the second part 2126b of the divided microcell starts with the first octet in the ATM-cell payload. The ATM-cell 2110 has a further microcell 2128 and a first part 2130a of another divided microcell. The ATM-cell 2112 starts with the remaining part 2130b of the divided microcell from the ATM-cell 2110. Since the ATM-cell 2112 contains the MSP 2118 in the first octet, the part 2130b starts in the second octet of the payload. The MSP 2118 in accordance with arrow 2132 points at the start of a microcell 2134 following upon the divided microcell. A further microcell follows at 2136. Since the ATM-cell 2114 does not contain any MSP a microcell 2138 starts in the first octet of its payload.

As stated above, the first octet in the ATM-cell payload contains a microcell start pointer MSP 2102 together with two parity bits P0 2104 and P1 2106 if the SDU-type=0. This is indicated by filled rings 2139a in the ATM-cell header pointing to a MSP following in the first octet. The SDU-type=1 is used to indicate that the first octet contains a microcell, this being indicated by unfilled rings 2139b. The MSP is used to indicate the start of the microcell in the ATM-cell payload and the parity bits are used to verify the correctness of the MSP. A microcell can start anywhere in the ATM-cell payload. The microcell start pointer MSP counts octets starting with value 0 indicating first octet in the ATM-cell payload and consequently value 47 pointing at the last octet in the ATM-cell payload. Values equal to 0 or larger than 47 are not accepted. As with the first method described with reference to FIGS. 4 and 5, cf. FIG. 4b, the value 0 implies that the payload of the ATM cell in question does only contain a part of a microcell that does neither start nor end in that payload. The value 47 indicates that a new microcell starts in the last octet of the ATM-cell payload. The main function of the MSP is to align the microcell stream. With the MSP a lost microcell alignment can be restored within the ATM-cell time frame.

The P0 bit is used to obtain odd parity for the bits: P0, MSP, bit 1,3,5. The P1 bit is used to obtain odd parity for the bits: P1, MSP, bit 0,2,4.

Figure 22:
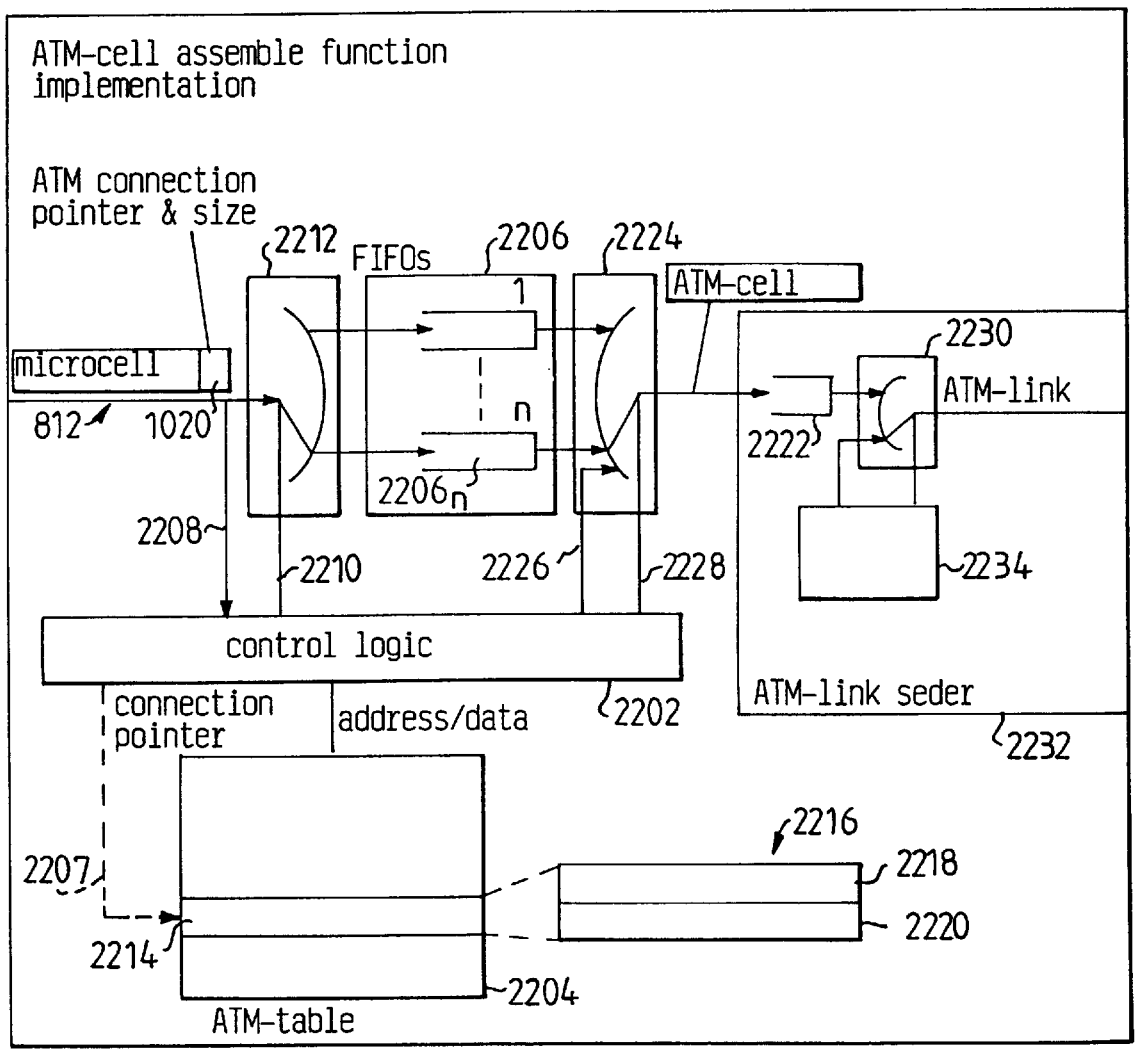
FIG. 22 is a view identical to the one in FIG. 13 schematically illustrating an examplary embodiment of an ATM cell assembling function in connection with the fourth method.

FIG. 22 is a view identical to the one in FIG. 13 schematically illustrating an examplary embodiment of the ATM cell assembling function 814. In FIG. 22 the two last figures of designating numbers starting with 22 are the same as the two last figures of designating numbers starting with 13 in in FIG. 13 and indicating the same elements. For explanation of these elements lacking here reference is made to the description with respect to FIG. 13.

The arriving microcells 812 and its accompanying ATM connection pointer 1040 and microcell size invokes the control logic 2202. The control logic 2202 can be a processor or specific hardware carrying out the flows to be described below with reference to FIG. 23. The microcell is temporarily stored in one of the FIFOs 2206. One FIFO for each ATM-connection is needed. The control logic uses the ATM connection pointer to identify the specific FIFO (1 to n) in question. The control logic 2202 uses the demultiplexer 2212 to put the microcell in the relevant FIFO. The ATM-table 2204 holds one position 2214 for each ATM-connection. The position contains the ATM-header 2218 and state variables 2220 for the connection and assemble process. The type of state variables are given by the description with reference to FIG. 23.

When the number of microcells stored for the connection is sufficient to fill the ATM-cell payload the ATM-cell is assembled and sent to the FIFO 1322. The ATM-header 2218 is read from the ATM-table 2204 and put cut on the ATM-link by means of the multiplexer 2224 and its input 2226. The SDU-type in the PTI-field of the ATM-cell header is set accordingly. SDU-type=0 if no microcell start pointer shall occur in the first octet. SDU-type=1 if the MSP shall be inserted as first octet in the ATM-cell payload.

If the microcell start pointer MSP shall be included it is assembled together with the parity bits P0 and P1 and put directly after the ATM-cell header as the first octet in the ATM-cell payload. The MSP is stored as a state variable 2220 in the table 2214, enabling calculation of the value in case of a divided microcell. The multiplexer input 2226 is used to insert the first octet. Immediately after that, the multiplexer 2224 is shifted to the FIFO 2206 belonging to the ATM connection in question and the FIFO is unloaded up to the point where the ATM-cell payload is filled completely.

The ATM-link sender 2232 sends ATM-cells on the ATM-link. If an ATM-cell is present in the FIFO 1322 it is sent out on the ATM-link through the multiplexer 1330. If no ATM-cell is present an idle ATM-cell is generated by means of the idle cell generator 2234 and issued to maintain the ATM-cell stream on the ATM-link.

Figure 23:
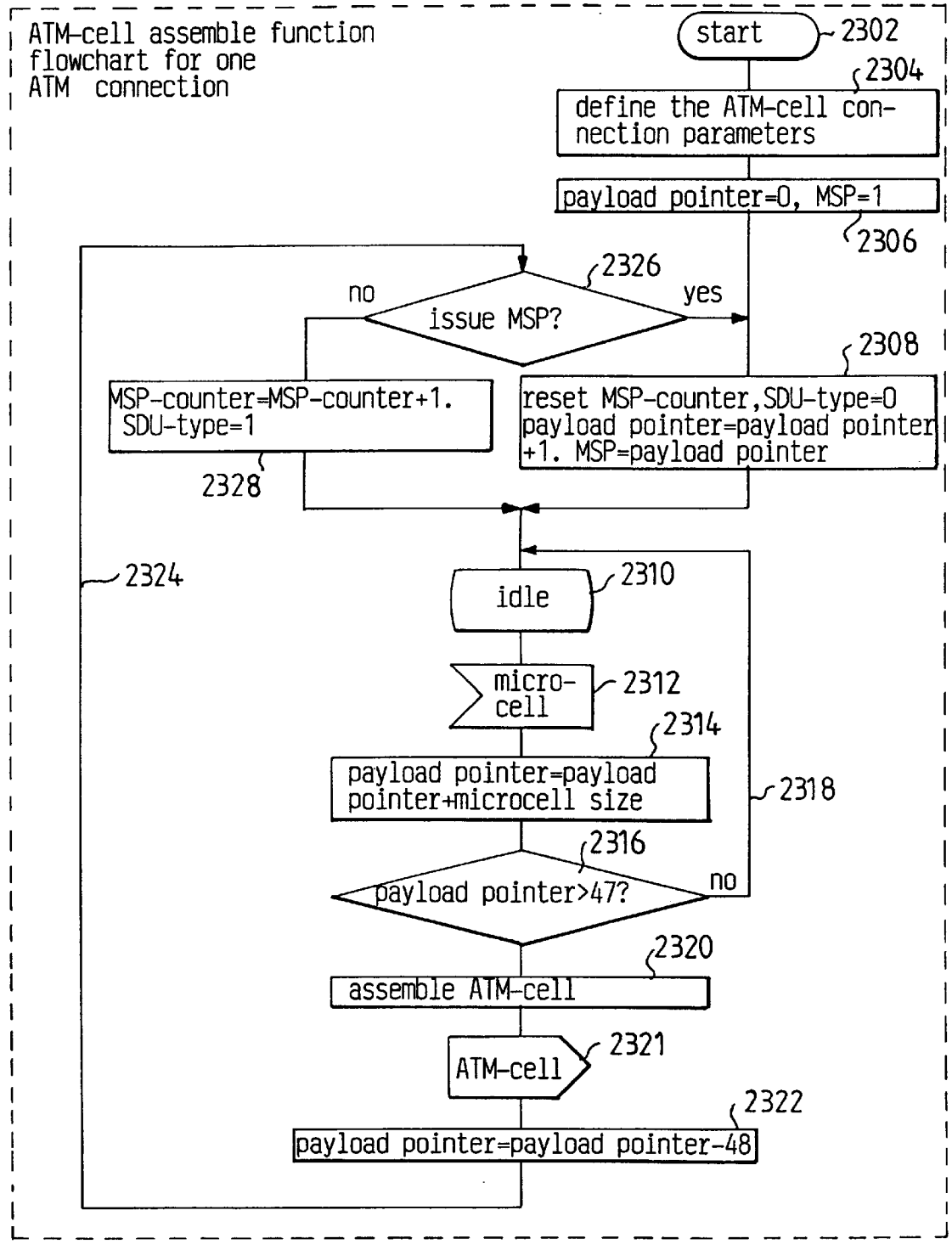
FIG. 23 is a flowchart illustrating the assembling steps performed by the structure illustrated in FIG. 22 when used for performing the method according to FIG. 21, FIGS. 24a–b form a basic flowchart illustrating the disassembling process in the method according to FIGS. 21–23.

FIG. 23 is a flowchart illustrating the assembling steps performed by the structure described with reference to FIG. 22 when used for performing the method described with reference to FIG. 21.

The flow starts at establishment of the ATM connection, step 2302. It ends when the connection is cleared.

In step 2304 the ATM-header is defined, i.e. the VCI and VPI are defined. How often MSP shall be issued is also set in a MSP-threshold parameter, e.g. every eight ATM-cell.

In step 2306 the MSP now points on the octet 1 in the first ATM-cell payload. The payload pointer is a state variable that keeps track on current fill level in the ATM-cell payload. The MSP and the payload pointer are stored as state variables 2220 in the position 2214 assigned for the connection in the ATM-table 2204.

In step 2308 the variables are set accordingly for the ATM-cell containing the MSP. Directly after start, the SDU-type=0 indicating a MSP. The MSP is set to point at the microcell header.

Step 2310 is an idle state, waiting for a microcell belonging to the connection to appear. In step 2312 a microcell has arrived originating from steps 1120 or 1122 in FIG. 11.

In step 2314 the payload pointer is adjusted according to current microcell size by setting the payload pointer to payload−pointer+microcell size In step 2316 a check is made by payload pointer>47? to see if current microcell overlaps into next ATM-cell. If not return is made to idle state 2310 according to arrow 2318. Otherwise the ATM-cell is assembled in step 2320 as described with reference to FIG. 22. If the SDU-type=0, then the MSP and corresponding parity bits P0 and P1 are downloaded as first octet in the multiplexer 2224 as controlled via the input 2226 by the control logic 2202. The following 47 octets are fetched from the relevant FIFO 2206. If the SDU-type=1 then the following 48 octets are fetched from the relevant FIFO 2206 directly after the ATM-cell header is downloaded in the multiplexor 2224.

In step 2321 the ATM-cell now put in the FIFO 1322 will trigger the process described with reference to FIG. 15.

By setting in step 2322 the payload pointer to payload pointer−48 it will be prepared for assembly of the next ATM-cell belonging to the connection.

The flow now proceeds according to arrow 2324 to step 2326 in which a test is made on the MSP-counter to see if an MSP shall be issued as first octet in the ATM-cell. Every time the MSP-counter equals the MSP-threshold a MSP shall be issued.

If an MSP shall be issued the flow proceeds starting with step 2308 anew. Otherwise the variables are set accordingly in step 2328 for an ATM-cell not containing any MSP. This is performed by setting MSP counter to MSP counter+1 and SDU-type to 1.

Figure 24A:
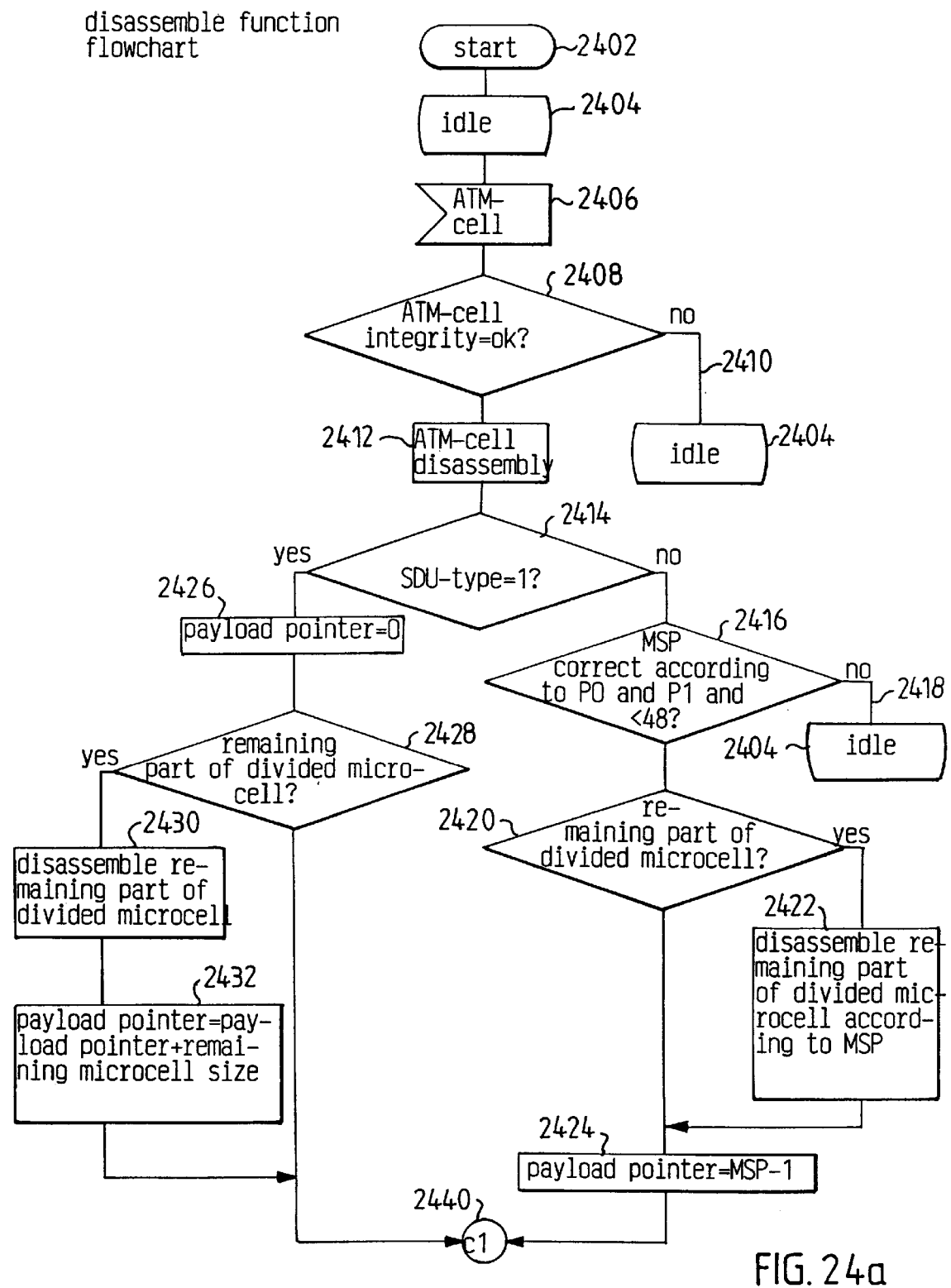

FIGS. 24a,b form a basic flowchart illustrating the disassembling process. The start in FIG. 24a in step 2402 includes establishing ATM and microcell connections by loading configuration data into the ATM-table 1704 (160) and CID-table 1706 as described with reference to FIG. 17.

Step 2404 is an idle state waiting for an ATM-cell to arrive.

In step 2406 an ATM-cell appears in the FIFO 1712 and the control logic 1702 is invoked.

In step 2408 an integrity check is made of the ATM-cell header according to HEC and that the VP/VC is valid, i.e. belongs to an established ATM-connection. If the integrity check fails the entire ATM-cell is deleted and a return to the idle state 2404 is made as indicated at 2410.

In step 2412 the ATM-cell header is removed from the FIFO 1712 to enable the microcell disassembling process to start.

In step 2414 SDU-type in current ATM-cell header is checked. If SDU-type=0, then the MSP with parity bit occupies the first octet in the ATM-cell payload, else the octet is carrying a microcell.

If SDU-type=0 in step 2414 step 2416 follows in which the first octet containing the MSP and parity bits is removed from the FIFO 1712. A check is made in step 2416 on the MSP integrity. If not correct, the idle state 2404 is entered as indicated at 2418. The MSP is temporarily saved. In step 2420 a check is made to see if current microcell is divided, i.e. if an already disassembled part existence is indicated in the ATM-table 1704 for the connection in question. If there is a remaining part the disassemble process is resumed in step 2422. The remaining microcell size is calculated from MSP−1. Other relevant data needed to proceed are fetched from the ATM-table 1704 and CID-table 1706. The remaining microcell data in the FIFO 1712 are moved to the relevant FIFO 1718 assigned to current ATM-connection. In step 2424 the payload pointer is set to the MSP. By doing this the microcell stream is realigned.

If SDU-type is 1 in step 2414 the payload pointer is set to zero in step 2426 since the ATM-cell payload first octet carries a part of a microcell. In step 2428 a check is made to see if current microcell is divided, i.e. if an already disassembled part existence is indicated in the ATM-table 1704 for the connection in question. If yes the disassembling process is resumed in step 2430. Relevant data, including remaining size of the microcell, needed to proceed are fetched from the ATM-table 1704 and CID-table 1706. The remaining microcell data in the FIFO 1712 are moved to the relevant FIFO 1718 assigned to current ATM-connection. In step 2432 the payload pointer is adjusted by setting it to payload pointer+remaining microcell size in order to keep track of remaining octets in the ATM-cell payload.

Figure 24B:
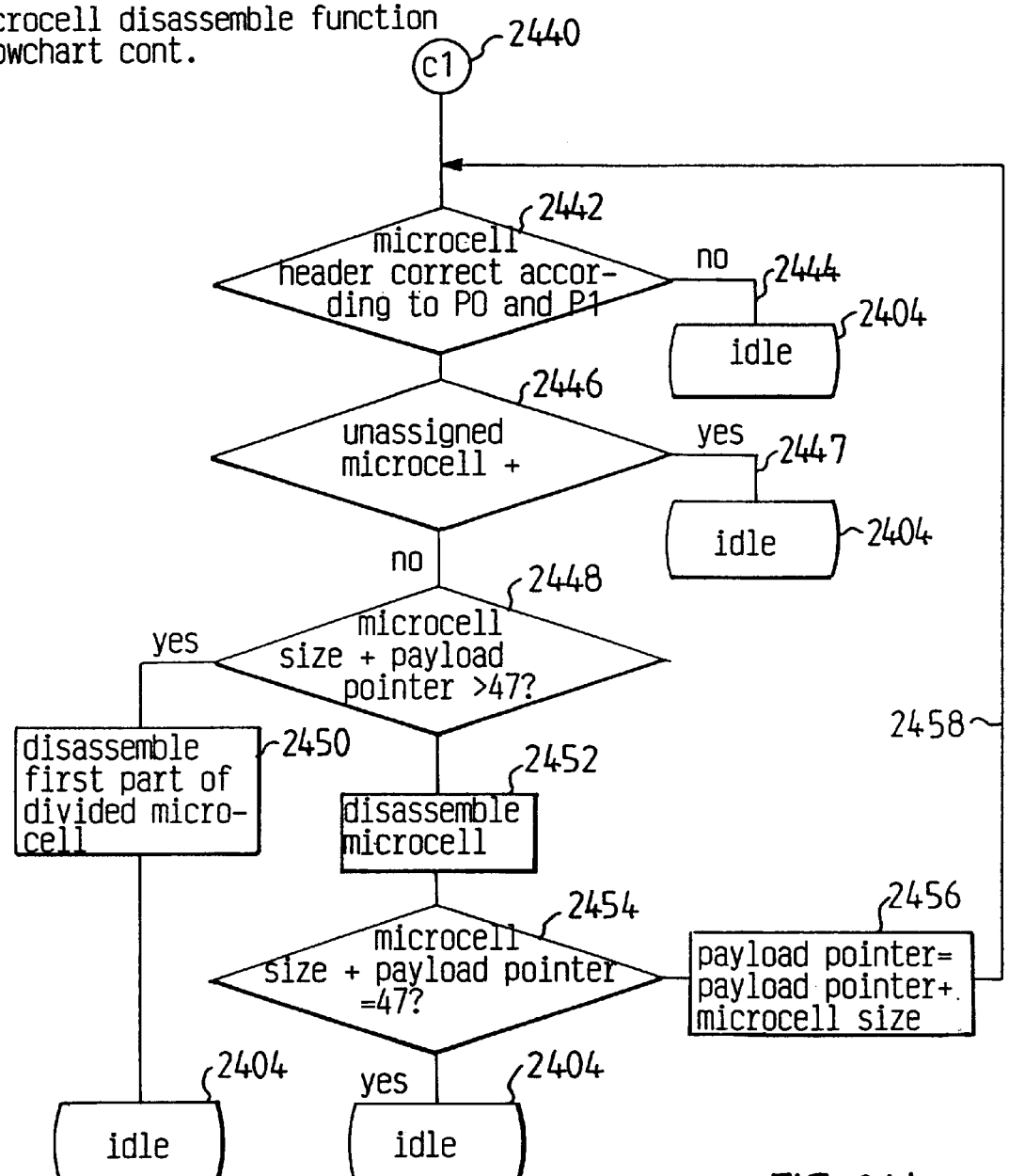

The symbole 2440 indicates continuation of the flow in FIG. 24b. In step 2442 microcell header integrity is checked. If not correct the idle state 2404 is entered as indicated at 2444.

In step 2446 a check is made for an unassigned microcell. If there is one the idle state 2404 is entered as indicated at 2447. As mentioned earlier an unassigned microcell is characterized by a predefined CID-value and indicates that the remaining part of the ATM-cell payload is occupied by the unassigned microcell.

In step 2448 a check is made by microcell size+payload pointer>47? to see if next microcell overlaps the current ATM-cell. If yes, the part contained in this ATM-cell is disassembled and relevant parameters are stored in step 2450 to enable resumption of the disassemble process when the remaining part appears. The process ends in the idle state 2404.

If no in step 2448, the whole microcell is disassembled in step 2452.

In step 2454 a check is made by microcell size+payload pointer=47? to see if the current microcell evens up with the ATM-cell payload. If no, the payload pointer is updated in step 2456 with the microcell size in order to prepare disassembling of the next one in current ATM-cell. The process starts anew by returning to step 2442 according to arrow 2458. If yes in step 2454, the process ends in the idle state 2404.

What is claimed is:

1. A telecommunication system comprising a sending entity, a receiving entity and an ATM link between the sending and receiving entities for transferring ATM cells on specific separate ATM connections, said ATM cells including user ATM cells having a header and payload containing data in the form of a determined number of data units which carry data in microcells, said header including an ATM connection pointer, said microcells having payload for carrying a variable size user data package and a microcell header containing code identifying a microcell connection, a microcell being not able to fit in its entirety in a remaining space of an ATM cell belonging to a certain ATM connection being divided into a first part located in at least one following ATM cell belonging to the same ATM connection, there being furthermore microcell size information associated with each microcell, wherein microcell boundary indicating code includes a microcell start pointer located in each ATM cell in the first one of said data units and pointing at a first new microcell within the payload of the ATM cell, said microcell start pointer including divided microcell size indicating code able to indicate the size of the remaining part of a divided microcell.

2. A system according to claim 1, in which the microcell start pointer is able to take a value (0) indicating that the whole rest of the ATM cell payload following on the microcell pointer contains part of a microcell.

3. A system according to claim 1, in which the microcell size information is in the form of a size indicator in the header of each microcell.

4. A system according to claim 1, in which the microcell size information is located in a table.

5. A system according to claim 1, in which said sending entity comprises:

user data receiving means for receiving user data including data in the form of variable size data packets each provided with a destination pointer, microcell assembling means for providing the received data packets according to their respective destination pointers with a respective microcell header for forming microcells in microcell connection specific processes, user ATM cell assembling means, including means for creating, in response to receiving microcells from the microcell assembling means, and controlled by the microcell connection indicated in the respective microcell headers, an ATM connection specific process for each ATM connection required, means for multiplexing, in each ATM connection specific process, the respective received microcells into the payload of user ATM cells;

said receiving entity comprises:

ATM connection distributing means for receiving user ATM cells and distributing these according to the ATM connection identified in their respective ATM cell header on ATM connection specific outputs, ATM cell disassembling means, including means for creating, in response to receiving ATM cells from the distributing means, and controlled by the ATM cell connection indicated in the respective ATM cell headers, a microcell specific process for each microcell connection required, means for demultiplexing the ATM cells from each ATM connection specific output, including means for aligning the microcells by identifying their boundaries using said microcell boundary indicating code, and means for separating and distributing the aligned microcells on microcell connection specific outputs, microcell disassembling means for receiving the microcells from each microcell connection specific output, removing the user microcell header and restoring its data package.

6. A system according to claim 5, wherein the ATM cell assembling means comprise:

ATM connection specific FIFO means for temporarily storing arriving microcells, an ATM table storing ATM connection specific data needed for each connection, ATM cell assembling control logic for receiving the ATM connection pointer of arriving microcells for identifying and selecting an ATM connection specific FIFO means for each arriving microcell, and for using the pointer to address each relevant connection specific data in the ATM table for reading it, a microcell multiplexing means for receiving the data read by the control logic and corresponding microcells from the relevant FIFO and assembling them to form an ATM cell.

7. A system according to claim 6, wherein the ATM table in each position stores the microcell start pointer as a state variable, the value of which can be calculated by the control logic in case of a divided microcell, the control logic assembling and transferring the micro cell start pointer together with code for discriminating between a user microcell and microcell containing data used for performance and fault management, and transferring them to the microcell multiplexing means to be put directly after the ATM cell header as the first data unit in the ATM-cell payload.

8. A system according to claim 5, wherein the receiving entity comprises a microcell connection data table for storing data for each microcell connection, including microcell size data and an end destination pointer, an ATM table for storing data for each ATM connection, including data indicating the presence of a divided microcell, data relating to a divided microcell, and a pointer to the microcell connection data table for providing an address to data in this table of a microcell connection assigned to a current ATM connection, FIFO means for temporarily storing arriving user ATM cells, ATM cell disassembling control logic including logic for reading the ATM header and microcell headers from each ATM cell residing in the FIFO means and logic for reading the ATM table pointer to the microcell connection data table and thereby the end destination pointer from the microcell connection data table, multiplexing means controlled by the control logic for extracting the ATM header and microcell headers when read from the FIFO means and for assembling the user data by inserting the end destination pointer to each data packet, transfer means controlled by the control logic for transferring the user data and end destination pointer to output means.

9. A system according to claim 8, wherein said transfer means comprise demultiplexing means for receiving, in case of a divided microcell and controlled by the control logic, divided user data in the form of the pointer and a first part of the user data from the multiplexing means, a number of FIFO means for receiving and temporarily storing each divided user data from the demultiplexing means in a specific one of the FIFO means assigned to the current ATM connection, multiplexing means for unloading to the output means, as controlled by the control logic, each FIFO means when a divided user data therein has been completed by the appearance of the last part of the user data.

10. A system according to claim 9, wherein the microcell header includes code for discriminating between a user microcell and microcell containing data used for performance and fault management.

11. A system according to claim 10, wherein the microcell header includes code for verifying the correctness of the circuit identifying code and the discriminating code.

12. A system according to claim 10, wherein during the disassembling process data created by the discriminating code is accumulated and stored in the microcell connection data table, and when a microcell containing data used for performance and fault management appears, this microcell is stopped by the control logic.

13. A system according to claim 5, wherein the circuit identifying code includes code able to indicate that the microcell is not assigned to any connection and used to occupy remaining space of an ATM cell payload which is not enough for entering an assigned microcell therein.

14. A method for transferring microcells in a telecommunication system comprising a sending entity, a receiving entity and an ATM link between the sending and receiving entities for transferring ATM cells on specific separate ATM connections, said ATM cells including user ATM cells having a header and payload containing data in the form of a determined number of data units which carry data in microcells, said header including an ATM connection pointer, said microcells having payload for carrying a variable size user data package and a microcell header containing code identifying a microcell connection, a microcell being not able to fit in its entirety in a remaining space of an ATM cell belonging to a certain ATM connection being divided into a first part located in at least one following ATM cell belonging to the same ATM connection, there being furthermore microcell size information associated with each microcell, the method comprising the steps of introducing as microcell boundary indicating code a microcell start pointer in each ATM cell in a first one of said data units and pointing at a first new microcell within the payload of the ATM cell, and introducing in the microcell start pointer code able to indicate the size of the remaining part of a divided microcell.

15. A method according to claim 14, comprising the step of:

multiplexing the microcells according to the ATM connection identified in the respective microcell header into the payload of user ATM cells the respective header of which identify the same respective ATM connection, introducing microcell boundary indicating code into each ATM cell;

distributing user ATM cells according to the ATM connection identified in their respective ATM cell header on ATM connection specific outputs, disassembling the ATM cells from each ATM connection specific output and aligning the microcells by identifying their boundaries, and separating and distributing the aligned microcells on microcell connection specific outputs, removing for each microcell the user microcell header and restoring its data package.

16. A method according to claim 15, comprising introducing in the microcell header code for discriminating between a user microcell and microcell containing data used for performance and fault management.

17. A method according to claim 16, comprising introducing in the microcell header code verifying the correctness of the circuit identifying code and the discriminating code.

18. A method according to any of claim 15, said disassembling of the ATM cells comprising storing data for each microcell connection, including microcell size data and an end destination pointer, storing data for each ATM connection, including data indicating the presence of a divided microcell, data relating to a divided microcell, and a pointer to the microcell connection data table for providing an address to data in this table of a microcell connection assigned to a current ATM connection, temporarily storing arriving user ATM cells, reading the ATM header and microcell headers from each temporarily stored ATM cell and reading the ATM table pointer to the microcell connection data table and thereby the end destination pointer from the microcell connection data table, extracting the ATM header and microcell headers when read and assembling the user data by inserting the end destination pointer to each data packet, transferring the user data and end destination pointer to output means.

19. A method according to claim 18, comprising receiving, in case of a divided microcell, divided user data in the form of the pointer and a first part of the user data, temporarily storing each divided user data, unloading to the output means the temporarily stored data when the last part of a divided user data has been completed by the appearance of the last part of the user data.

20. A method according to claim 18, comprising accumulating during the disassembling process data created by the discriminating code and storing it in the microcell connection data table, and when a microcell containing data used for performance and fault management appears, stopping this microcell.

21. A method according to claim 14, comprising
temporarily storing arriving microcells,
storing ATM connection specific data needed for each connection,
using the ATM connection pointer of arriving microcells for identifying and temporarily storing each arriving microcell, and using the pointer to provide relevant ATM connection specific data,
assembling the data and corresponding microcells to form an ATM cell.

22. A method according to claim 21, comprising storing the microcell start pointer as a state variable, the value of which can be calculated by the control logic in case of a divided microcell, assembling and transferring the microcell start pointer together with code verifying the correctness of the circuit identifying code and the discriminating code and putting them directly after the ATM-cell header as the first data unit in the ATM-cell payload.

23. A method according to any of claim 14, comprising indicating whether the microcell is not assigned to any connection and occupying remaining space of an ATM cell payload which is not enough for entering an assigned microcell therein.

24. A method for transferring microcells in a telecommunication system comprising a sending entity, a receiving entity and an ATM link between the sending and receiving entities for transferring ATM cells on specific separate ATM connections, said ATM cells including user ATM cells having a header and payload containing data in the form of a determined number of data units which carry data in microcells, said header including an ATM connection pointer, said microcells having payload for carrying a variable size user data package and a microcell header containing code identifying a microcell connection, a microcell being not able to fit in its entirety in a remaining space of an ATM cell belonging to a certain ATM connection being divided into a first part located in at least one following ATM cell belonging to the same ATM connection, there being furthermore microcell size information associated with each microcell, the method comprising the steps of introducing as microcell boundary indicating code a microcell start pointer in every n-th ATM cell in a first one of said data units pointing at the first undivided microcell within the payload of the ATM cell, and introducing in the header of each ATM cell code able to be set to indicate whether the first data unit contains a microcell start pointer or not.

25. The method of claim 24, further comprising the steps of:
temporarily storing arriving microcells,
storing ATM connection specific data needed for each connection,
using the ATM connection pointer of arriving microcells for identifying and temporarily storing each arriving microcell, and using the pointer to provide relevant ATM connection specific data, and
assembling the data and corresponding microcells to form an ATM cell.

26. A method according to claim 25, comprising setting the microcell division indicating code to indicate whether the first microcell in the ATM cell is a new one or a divided one.

27. A method for transferring microcells in a telecommunication system comprising a sending entity, a receiving entity and an ATM link between the sending and receiving entities for transferring ATM cells on specific separate ATM connections, said ATM cells including user ATM cells having a header and payload containing data in the form of a determined number of data units which carry data in microcells, said header including an ATM connection pointer, said microcells having payload for carrying a variable size user data package and a microcell header containing code identifying a microcell connection, a microcell being not able to fit in its entirety in a remaining space of an ATM cell belonging to a certain ATM connection being divided into a first part located in at least one following ATM cell belonging to the same ATM connection, there being furthermore microcell size information associated with each microcell, the method comprising the step of introducing as microcell boundary indicating code a microcell start pointer and introducing in the header of each ATM cell code able to be set to indicate whether the first microcell in the ATM cell is a new one or a divided one.

28. The method of claim 27, further comprising the steps of:
temporarily storing arriving microcells,
storing ATM connection specific data needed for each connection,
using the ATM connection pointer of arriving microcells for identifying and temporarily storing each arriving microcell, and using the pointer to provide relevant ATM connection specific data, and
assembling the data and corresponding microcells to form an ATM cell.

29. A method according to claim 28, comprising storing the microcell start pointer as a state variable, the value of which can be calculated by the control logic in case of a divided microcell, assembling and transferring the microcell start pointer together with code verifying the correctness of the circuit identifying code and the discriminating code and putting them directly after the ATM cell header as the first data unit in the ATM cell payload and setting the microcell division indicating code to indicate whether the first data unit contains a microcell start pointer or not.

30. A method for transferring microcells in a telecommunication system comprising a sending entity, a receiving entity and an ATM link between the sending and receiving entities for transferring ATM cells on specific separate ATM connections, said ATM cells including user ATM cells having a header and payload containing data in the form of a determined number of data units which carry data in microcells, said header including an ATM connection pointer, said microcells having payload for carrying a variable size user data package and a microcell header containing code identifying a microcell connection, there being furthermore microcell size information associated with each microcell, the method comprising the steps of only allowing start of an ATM cell payload with a new microcell, and sending, if a space of a last data unit in the payload is not enough for entering a further microcell therein, this microcell in a next ATM cell belonging to the same connection, and filling said space with a microcell being not assigned to any microcell connection.

31. The method of claim 30, further comprising the steps of:
temporarily storing arriving microcells,
storing ATM connection specific data needed for each connection, using the ATM connection pointer of arriving microcells for identifying and temporarily storing each arriving microcell, and using the pointer to provide relevant ATM connection specific data, and assembling the data and corresponding microcells to form an ATM cell.

32. A method according to claim 31, comprising calculating whether the space of the last data unit in the ATM cell payload is not enough for entering a further microcell and if this is the case inserting an unassigned microcell in the remaining space of the ATM cell payload.

33. A telecommunication system comprising a sending entity, a receiving entity and an ATM link between the sending and receiving entities for transferring ATM cells on specific separate ATM connections, said ATM cells including user ATM cells having a header and payload containing data in the form of a determined number of data units which carry data in microcells, said header including an ATM connection pointer, said microcells having payload for carrying a variable size user data package and a microcell header containing code identifying a microcell connection, a microcell being not able to fit in its entirety in a remaining space of an ATM cell belonging to a certain ATM connection being divided into a first part located in at least one following ATM cell belonging to the same ATM connection, there being furthermore microcell size information associated with each microcell, wherein microcell boundary indicating code includes a microcell start pointer located in every n-th ATM cell in the first one of said data units and pointing at a first new microcell within the payload of the ATM cell, the microcell start pointer including code able to indicate the size of the remaining part of a divided microcell, code located in the header of each ATM cell and able to be set to indicate whether the first data unit in the ATM cell is a microcell start pointer or not.

34. The system of claim 33, in which the sending entity comprises:

user data receiving means for receiving user data including data in the form of variable size data packets, each provided with a destination pointer, microcell assembling means for providing the received data packets according to their respective destination pointers with a respective microcell header for forming microcells in microcell connection specific processes, user ATM cell assembling means including means for creating, in response to receiving microcells from the microcell assembling means, and controlled by the microcell connection indicated in the respective microcell headers, an ATM connection specific process for each ATM connection required, means for multiplexing, in each ATM connection specific process, the respective received microcells into the payload of user ATM cells;

the receiving entity comprises:

ATM connection distributing means for receiving user ATM cells and distributing these according to the ATM connection identified in their respective ATM cell header on ATM connection specific outputs, ATM cell disassembling means, including means for creating, in response to receiving ATM cells from the distributing means, and controlled by the ATM cell connection indicated in the respective ATM cell headers, a microcell specific process for each microcell connection required, means for demultiplexing the ATM cells from each ATM connection specific output, including means for aligning the microcells by identifying their boundaries using the microcell boundary indicating code, and means for separating and distributing the aligned microcells on microcell connection specific outputs, microcell disassembling means for receiving the microcells from each microcell connection specific output, removing the user microcell header and restoring its data package.

35. The system of claim 34, wherein the ATM cell assembling means comprise:

ATM connection specific FIFO means for temporarily storing arriving microcells, an ATM table storing ATM connection specific data needed for each connection, ATM cell assembling control logic for receiving the ATM connection pointer of arriving microcells for identifying and selecting an ATM connection specific FIFO means for each arriving microcell, and for using the pointer to address each relevant connection specific data in the ATM table for reading it, a microcell multiplexing means for receiving the data read by the control logic and corresponding microcells from the relevant FIFO and assembling them to form an ATM cell.

36. A system according to claim 35, wherein the ATM table in each position stores the microcell start pointer as a state variable, the value of which can be calculated by the control logic in case of a divided microcell, and the control logic sets the microcell division indicating code located in the header of each ATM cell to indicate whether the first data unit contains a microcell start pointer or not, and assembles and transfers the microcell start pointer, if present, to be put directly after the ATM cell header as the first data unit in the ATM cell payload.

37. A telecommunication system comprising a sending entity, a receiving entity and an ATM link between the sending and receiving entities for transferring ATM cells on specific separate ATM connections, said ATM cells including user ATM cells having a header and payload containing data in the form of a determined number of data units which carry data in microcells, said header including an ATM connection pointer, said microcells having payload for carrying a variable size user data package and a microcell header containing code identifying a microcell connection, a microcell being not able to fit in its entirety in a remaining space of an ATM cell belonging to a certain ATM connection being divided into a first part located in at least one following ATM cell belonging to the same ATM connection, there being furthermore microcell size information associated with each microcell, wherein microcell boundary indicating code includes microcell division indicating code located in the header of each ATM cell and able to be set to indicate whether the first microcell in the ATM cell is a new one or a divided one.

38. The system of claim 37, in which the sending entity comprises:

user data receiving means for receiving user data including data in the form of variable size data packets, each provided with a destination pointer, microcell assembling means for providing the received data packets according to their respective destination pointers with a respective microcell header for forming microcells in microcell connection specific processes, user ATM cell assembling means including means for creating, in response to receiving microcells from the microcell assembling means, and controlled by the microcell connection indicated in the respective microcell headers, an ATM connection specific process for each ATM connection required, means for multiplexing, in each ATM connection specific process, the respective received microcells into the payload of user ATM cells;

the receiving entity comprises:

ATM connection distributing means for receiving user ATM cells and distributing these according to the ATM connection identified in their respective ATM cell header on ATM connection specific outputs, ATM cell disassembling means, including means for creating, in response to receiving ATM cells from the distributing means, and controlled by the ATM cell connection indicated in the respective ATM cell headers, a microcell specific process for each microcell connection required, means for demultiplexing the ATM cells from each ATM connection specific output, including means for aligning the microcells by identifying their boundaries using the microcell boundary indicating code, and means for separating and distributing the aligned microcells on microcell connection specific outputs, microcell disassembling means for receiving the microcells from each microcell connection specific output, removing the user microcell header and restoring its data package.

39. The system of claim 38, wherein the ATM cell assembling means comprise:

ATM connection specific FIFO means for temporarily storing arriving microcells, an ATM table storing ATM connection specific data needed for each connection, ATM cell assembling control logic for receiving the ATM connection pointer of arriving microcells for identifying and selecting an ATM connection specific FIFO means for each arriving microcell, and for using the pointer to address each relevant connection specific data in the ATM table for reading it, a microcell multiplexing means for receiving the data read by the control logic and corresponding microcells from the relevant FIFO and assembling them to form an ATM cell.

40. A system according to claim 39, wherein the control logic sets the microcell division indicating code (SDU) located in the header of each ATM cell to indicate whether the first microcell in the ATM cell is a new one or a divided one.

41. A telecommunication system comprising a sending entity, a receiving entity and an ATM link between the sending and receiving entities for transferring ATM cells on specific separate ATM connections, said ATM cells including user ATM cells having a header and payload containing data in the form of a determined number of data units which carry data in microcells, said header including an ATM connection pointer, said microcells having payload for carrying a variable size user data package and a microcell header containing code identifying a microcell connection, there being furthermore microcell size information associated with each microcell, wherein start of an ATM cell payload is only allowed with a new microcell, said microcell boundary indicating code including code to provide that if the space of the last data unit in the ATM cell payload is not enough for entering a further microcell therein this microcell will be sent in a next ATM cell belonging to the same connection, said space being filled with a microcell being not assigned to any microcell connection.

42. The system of claim 41, in which the sending entity comprises:

user data receiving means for receiving user data including data in the form of variable size data packets, each provided with a destination pointer, microcell assembling means for providing the received data packets according to their respective destination pointers with a respective microcell header for forming microcells in microcell connection specific processes, user ATM cell assembling means including means for creating, in response to receiving microcells from the microcell assembling means, and controlled by the microcell connection indicated in the respective microcell headers, an ATM connection specific process for each ATM connection required, means for multiplexing, in each ATM connection specific process, the respective received microcells into the payload of user ATM cells;

the receiving entity comprises:

ATM connection distributing means for receiving user ATM cells and distributing these according to the ATM connection identified in their respective ATM cell header on ATM connection specific outputs, ATM cell disassembling means, including means for creating, in response to receiving ATM cells from the distributing means, and controlled by the ATM cell connection indicated in the respective ATM cell headers, a microcell specific process for each microcell connection required, means for demultiplexing the ATM cells from each ATM connection specific output, including means for aligning the microcells by identifying their boundaries using the microcell boundary indicating code, and means for separating and distributing the aligned microcells on microcell connection specific outputs, microcell disassembling means for receiving the microcells from each microcell connection specific output, removing the user microcell header and restoring its data package.

43. The system of claim 42, wherein the ATM cell assembling means comprise:

ATM connection specific FIFO means for temporarily storing arriving microcells, an ATM table storing ATM connection specific data needed for each connection, ATM cell assembling control logic for receiving the ATM connection pointer of arriving microcells for identifying and selecting an ATM connection specific FIFO means for each arriving microcell, and for using the pointer to address each relevant connection specific data in the ATM table for reading it, a microcell multiplexing means for receiving the data read by the control logic and corresponding microcells from the relevant FIFO and assembling them to form an ATM cell.

44. A system according to claim 43, wherein the control logic calculates whether the space of the last data unit in the ATM cell payload is not enough for entering a further microcell and if this is the case inserts an unassigned microcell in the remaining space of the ATM cell payload.

* * * * *